(12) United States Patent
Matsunaga et al.

(10) Patent No.: US 12,477,851 B2
(45) Date of Patent: Nov. 18, 2025

(54) OPTICAL SENSOR

(71) Applicant: Magnolia White Corporation, Tokyo (JP)

(72) Inventors: Kazuki Matsunaga, Tokyo (JP); Shigesumi Araki, Tokyo (JP); Yasushi Tomioka, Tokyo (JP)

(73) Assignee: Magnolia White Corporation, Tokyo (JP)

( * ) Notice: Subject to any disclaimer, the term of this patent is extended or adjusted under 35 U.S.C. 154(b) by 443 days.

(21) Appl. No.: 18/070,565

(22) Filed: Nov. 29, 2022

(65) Prior Publication Data

US 2023/0170367 A1 Jun. 1, 2023

(30) Foreign Application Priority Data

Dec. 1, 2021 (JP) ................................ 2021-195711

(51) Int. Cl.
*H10F 39/00* (2025.01)
*G02B 5/28* (2006.01)

(52) U.S. Cl.
CPC ............. *H10F 39/806* (2025.01); *G02B 5/28* (2013.01); *G02B 2207/123* (2013.01)

(58) Field of Classification Search
CPC .... H10F 77/331; H10F 39/806; H10F 39/809; H10F 39/80; G02B 2207/123; G02B 5/201; G02B 5/28
See application file for complete search history.

(56) References Cited

U.S. PATENT DOCUMENTS

2021/0045705 A1  2/2021  Morii et al.
2023/0031081 A1*  2/2023  Akiyama ............... H04N 23/12

FOREIGN PATENT DOCUMENTS

JP    S56-24309 A     3/1981
WO    2019/167145 A1  9/2019
WO    2021/161961 A1  8/2021

OTHER PUBLICATIONS

Japanese Office Action dated Aug. 19, 2025 for the corresponding Japanese Patent Application No. 2021-195711, with English machine translation.

* cited by examiner

*Primary Examiner* — Tucker J Wright
(74) *Attorney, Agent, or Firm* — Michael Best & Friedrich LLP

(57) ABSTRACT

An optical sensor includes a light receiving part including a plurality of pixels and receiving light from a measuring object, the pixels being disposed in a matrix along a first direction and a second direction, and a louver film in which a first layer and a second layer are laminated, the first layer including a transmissive portion that transmits light of a predetermined wavelength band and a light shielding portion that spiels light, the transmissive portion and the light shielding portion being alternately disposed along the first direction, the second layer including the transmissive portion and the light shielding portion that are alternately disposed along the second direction. The transmissive portion included in one of the first layer and the second layer includes a first wavelength selecting unit that transmits light of a first wavelength band and a second wavelength selecting unit that transmits light of a second wavelength band.

3 Claims, 15 Drawing Sheets

OPTICAL SENSOR

CROSS-REFERENCE TO RELATED APPLICATION

The present application claims priority from Japanese Application No. JP2021-195711 filed on Dec. 1, 2021, the content of which is hereby incorporated by reference into this application.

BACKGROUND OF THE INVENTION

1. Field of the Invention

The present invention relates to an optical sensor.

2. Description of the Related Art

An optical sensor irradiates a measuring object with light of a certain wavelength band for sensing reflected light or transmitted light from the measuring object, thereby acquiring predetermined information. For example, the optical sensor irradiates a finger with visible light for sensing reflected light or transmitted light, thereby acquiring information of a fingerprint. Further, the optical sensor irradiates a finger with near-infrared light and sensing transmitted light, thereby acquiring vein information.

The methods of extracting only parallel light from scattered light includes a method using a collimator (see WO2019/167145).

The optical sensor sequentially irradiates the measuring object with light of a plurality of wavelength bands at intervals for sensing reflected light and transmitted light from the measuring object, thereby acquiring a plurality of types of information related to the measuring object. However, this manner requires a long time to acquire all of the plurality of types of information.

One or more embodiments of the present invention have been conceived in view of the above, and an object thereof is to provide an optical sensor capable of acquiring a plurality of types of information with a plurality of wavelengths in a short time.

An optical sensor according to one aspect of the present disclosure includes a light receiving part including a plurality of pixels and receiving light from a measuring object, the pixels being disposed in a matrix along a first direction and a second direction orthogonal to the first direction in a plan view, and a louver part in which a first layer and a second layer are laminated, the first layer including a transmissive portion that transmits light of a predetermined wavelength band and a light shielding portion that shields light, the transmissive portion and the light shielding portion being alternately disposed along the first direction, the second layer including the transmissive portion and the light shielding portion that are alternately disposed along the second direction, wherein the transmissive portion included in one of the first layer and the second layer includes a first wavelength selecting unit that transmits light of a first wavelength band and a second wavelength selecting unit that transmits light of a second wavelength band.

An optical sensor according to one aspect of the present disclosure includes a light receiving part including a plurality of pixels and receiving light from a measuring object, the pixels being disposed in a matrix along a first direction and a second direction orthogonal to the first direction in a plan view, and a louver part in which a first layer and a second layer are laminated, the first layer including a first wavelength selecting unit that transmits light of a first wavelength band and a second wavelength selecting unit that transmits light of a second wavelength band, the first wavelength selecting unit and the second wavelength selecting unit being alternately disposed along the first direction, the second layer including the first wavelength selecting unit and the second wavelength selecting unit, which are alternately disposed along the second direction.

According to the present disclosure, it is possible to obtain a plurality of types of information with a plurality of wavelengths in a short time.

DETAILED DESCRIPTION OF THE INVENTION

Embodiments of the present invention will be described below in detail with reference to the accompanying drawings. In this regard, the present invention is not to be limited to the embodiments described below, and can be changed as appropriate without departing from the spirit of the invention.

The accompanying drawings may schematically illustrate widths, thicknesses, shapes, or other characteristics of each part for clarity of illustration, compared to actual configurations. However, such a schematic illustration is merely an example and not intended to limit the present invention. In this specification and the drawings, some elements identical or similar to those shown previously are denoted by the same reference signs as the previously shown elements, and thus repetitive detailed descriptions of them may be omitted as appropriate.

Further, in the detailed description of the present invention, when a positional relationship between a component and another component is defined, if not otherwise stated, the words "on" and "below" suggest not only a case where the another component is disposed immediately on or below the component, but also a case where the component is disposed on or below the another component with a third component interposed therebetween.

First Embodiment

Figure 1:
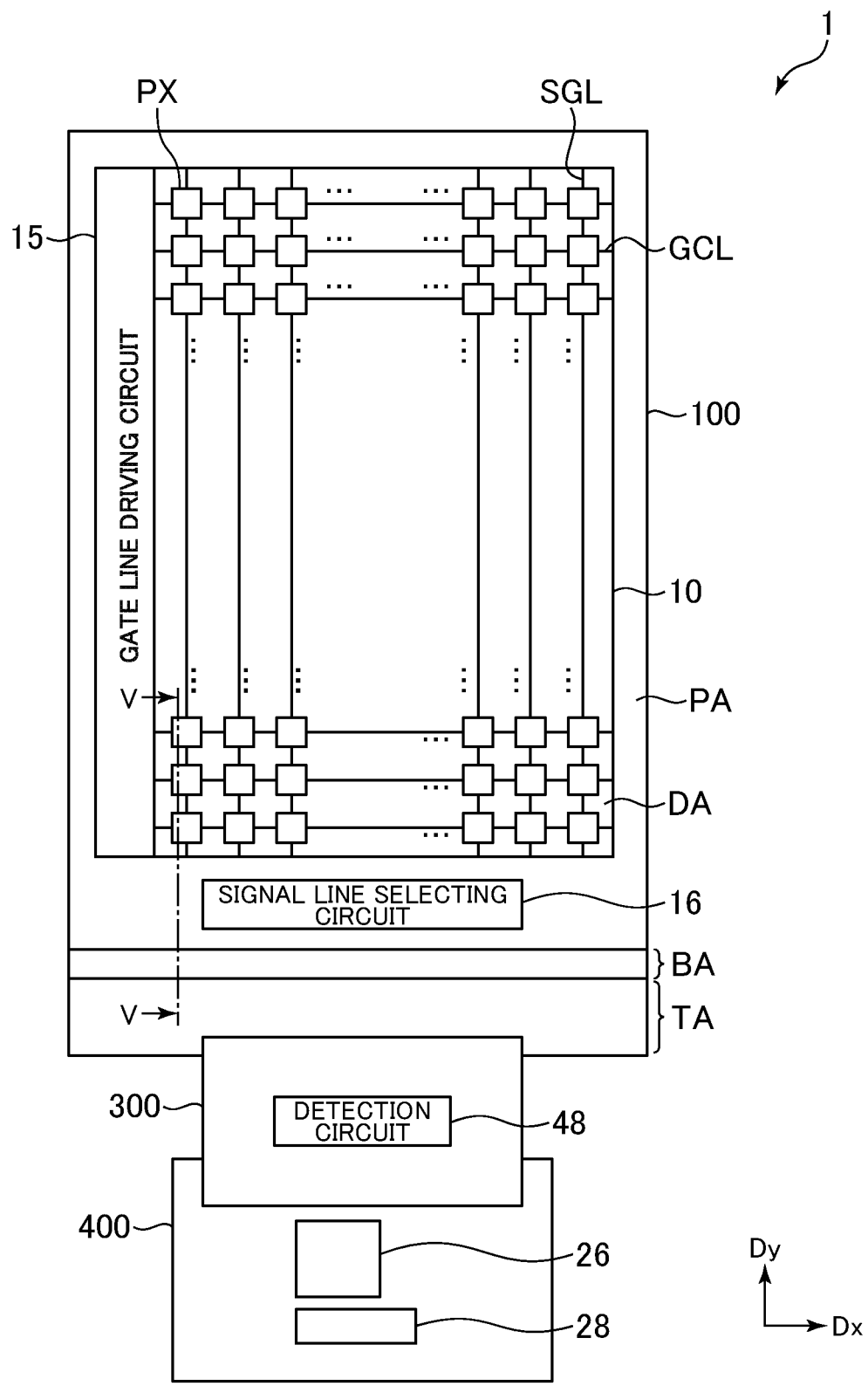
FIG. 1 is a schematic plan view of an optical sensor.

FIG. 1 is a schematic plan view of an optical sensor 1 according to the first embodiment of the present invention. As shown in FIG. 1, the optical sensor 1 includes a resin substrate 100, a light receiving part 10, a gate line driving circuit 15, a signal line selecting circuit 16, a control circuit 26, a power supply circuit 28, a detection circuit 48, a flexible printed substrate 300, and a control substrate 400.

The resin substrate 100 is electrically connected to the control substrate 400 via the flexible printed substrate 300. The detection circuit 48 is provided on the flexible printed substrate 300. The control circuit 26 and the power supply circuit 28 are provided on the control substrate 400. The control circuit 26 supplies a control signal to the light receiving part 10, the gate line driving circuit 15, and the signal line selecting circuit 16 to control the detection operation of the light receiving part 10. The detection circuit 48 and the control circuit 26 are ICs (Integrated Circuit) and FPGAs (Field Programmable Gate Array), for example. The power supply circuit 28 supplies power supply voltage to the light receiving part 10, the gate line driving circuit 15, and the signal line selecting circuit 16.

The resin substrate 100 has a detection area DA and a frame area PA. The detection area DA is an area in which the light receiving part 10 is provided. The frame area PA is an area outside the detection area DA where the light receiving part 10 is not provided.

The frame area PA has a bending area BA and a terminal area TA. The bending area BA and the terminal area TA are provided at one end of the frame area PA. Wires connected to the detection area DA are disposed in the bending area BA and the terminal area TA. The resin substrate 100 and the flexible printed substrate 300 are connected in the terminal area TA.

The light receiving part 10 includes a plurality of pixels PX arranged in a plane surface and receives light from a measuring object. Specifically, the light receiving part includes the pixels PX arranged in a matrix along a first direction Dx and a second direction Dy orthogonal to the first direction Dx in a plan view, and receives light from the measuring object. The first direction Dx is an extending direction of a gate line GCL, and the second direction Dy is an extending direction of a signal line SGL. The pixels PX are arranged in a matrix in the detection area DA. The pixels PX include a photosensor 30 (see FIG. 4), which is a photodiode, and output an electric signal corresponding to light irradiated to each pixel PX. Each pixel PX outputs an electric signal, as a first detection signal Vdet, corresponding to the irradiated light to the signal line selecting circuit 16. Further, each pixel PX performs detection according to a gate drive signal Vgcl supplied from the gate line driving circuit 15.

The gate line driving circuit 15 and the signal line selecting circuit 16 are provided in the frame area PA.

Specifically, the gate line driving circuit 15 is disposed, in the frame area PA, in an area extending along the extending direction (second direction Dy) of the signal line SGL. The signal line selecting circuit 16 is disposed, in the frame area PA, in an area extending along the extending direction (first direction Dx) of the gate line GCL, and is disposed between the light receiving part 10 and the bending area BA.

Figure 2:
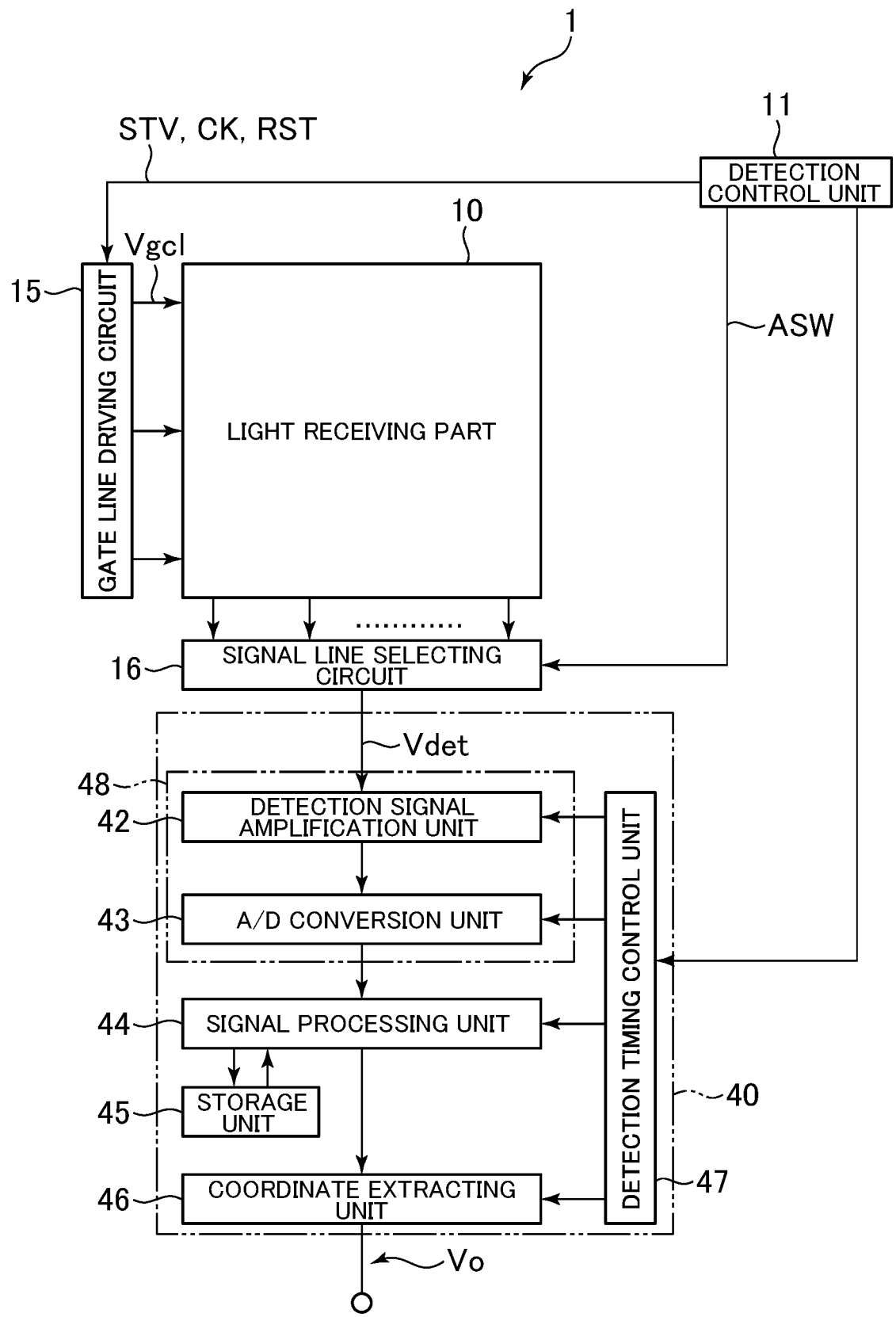
FIG. 2 is a block diagram showing an example of a configuration of the optical sensor.

FIG. 2 is a block diagram showing an example of a configuration of the optical sensor according to the embodiment of the present invention. As shown in FIG. 2, the optical sensor 1 further includes a detection control unit 11 and a detection unit 40. Some or all of the functions of the detection control unit 11 are included in the control circuit 26. Further, some or all of the functions of the detection unit 40 are included in the control circuit 26.

The detection control unit 11 is a circuit that respectively supplies control signals to the gate line driving circuit 15, the signal line selecting circuit 16, and the detection unit 40, and controls these operations. The detection control unit 11 supplies control signals, such as a start signal STV, a clock signal CK, and a reset signal RST, to the gate line driving circuit 15. Further, the detection control unit 11 supplies control signals, such as a selection signal ASW, to the signal line selecting circuit 16.

The gate line driving circuit 15 is a circuit that drives the gate line GCL based on the control signals. The gate line driving circuit 15 sequentially or simultaneously selects a plurality of gate lines GCL and supplies a gate drive signal Vgcl to the selected gate lines GCL. This enables the gate line driving circuit 15 to select the pixel PX connected to the gate line GCL.

The signal line selecting circuit 16 is a switch circuit that sequentially or simultaneously selects a plurality of signal lines SGL. The signal line selecting circuit 16 is a multiplexer, for example. The signal line selecting circuit 16 connects the selected signal line SGL with the detection circuit 48 based on the selection signal ASW supplied from the detection control unit 11. This enables the signal line selecting circuit 16 to output the first detection signal Vdet of the pixel PX to the detection unit 40.

The detection unit 40 includes a signal processing unit 44, a storage unit 45, a coordinate extracting unit 46, a detection timing control unit 47, and a detection circuit 48. The detection timing control unit 47 controls the signal processing unit 44, the coordinate extracting unit 46, and the detection circuit 48 to operate in synchronization based on the control signal supplied from the detection control unit 11.

The detection circuit 48 is an analog front-end (AFE) circuit, for example. The detection circuit 48 is a signal processing circuit having at least the functions of a detection signal amplification unit 42 and an A/D conversion unit 43. The detection signal amplification unit 42 amplifies the first detection signal Vdet. The A/D conversion unit 43 converts an analog signal output from the detection signal amplification unit 42 into a digital signal.

The signal processing unit 44 is a logic circuit that detects a predetermined physical quantity entered into the light receiving part 10 based on the output signal of the detection circuit 48. When a finger Fg comes into contact with or approaches the detection surface, the signal processing unit 44 can detect the unevenness of the surface of the finger Fg or the palm based on a signal from the detection circuit 48. Further, the signal processing unit 44 can detect information on a living body based on a signal from the detection circuit 48. The information on the living body is, for example, a blood vessel image of the finger Fg and the palm, a pulse wave, a pulse, and a blood oxygen saturation. Further, the signal processing unit 44 calculates a signal ΔV of the difference between the first detection signal Vdet and the second detection signal Vdet-R.

The storage unit 45 temporarily stores the signal calculated by the signal processing unit 44. Further, the storage unit 45 stores information about the first detection signal Vdet, the second detection signal Vdet-R, and the signal ΔV of the difference in the past. The storage unit 45 may be a random access memory (RAM) or a register circuit, for example. The coordinate extracting unit 46 is a logic circuit that obtains detection coordinates of unevenness on the surface of the finger Fg when the signal processing unit 44 detects a contact or an approach of the finger Fg. The coordinate extracting unit 46 is a logic circuit that obtains detection coordinates of a finger Fg or a blood vessel of a palm. The coordinate extracting unit 46 combines the first detect signals Vdet output from the respective photosensors 30 of the light receiving part 10 to generate two-dimensional data indicating the shapes of the unevennesses on the surface of the finger Fg, for example. The coordinate extracting unit 46 may output the first detection signal Vdet and the second detection signal Vdet-R as a sensor output Vo without calculating the detection coordinates.

Figure 3:
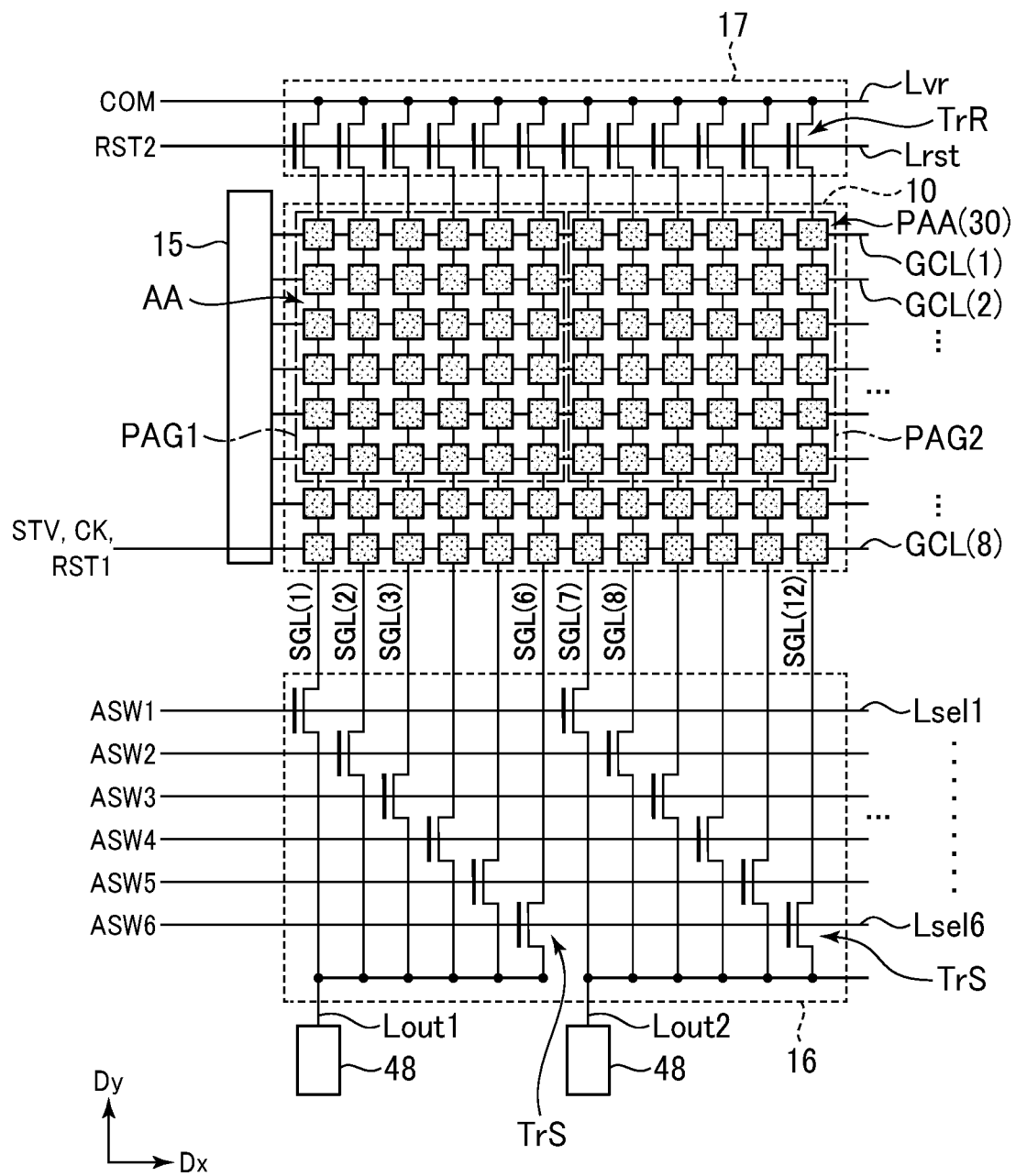
FIG. 3 is a circuit diagram of the optical sensor.
Figure 4:
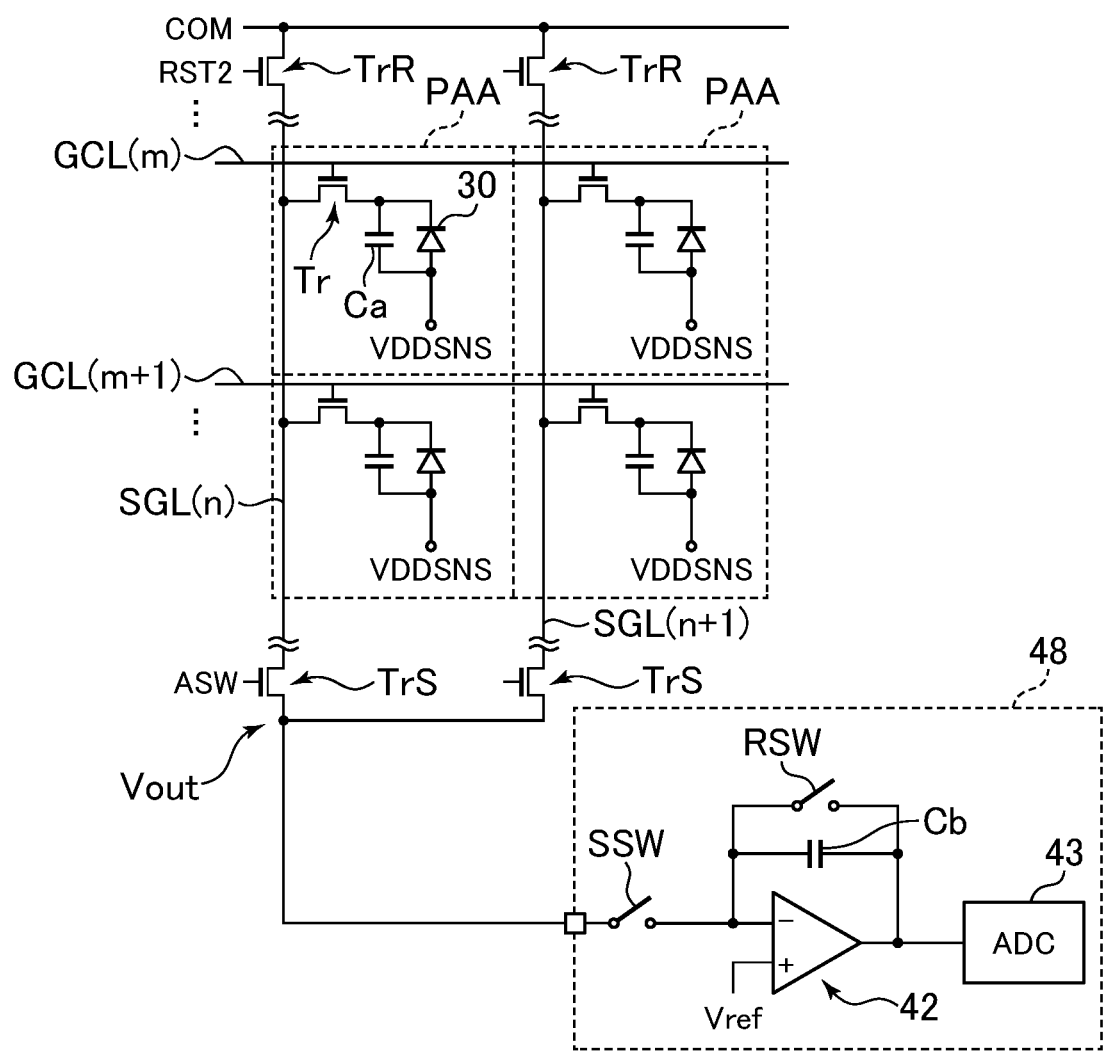
FIG. 4 is a circuit diagram of a part of a detection area.

Next, examples of a circuit configuration and an operation of the optical sensor 1 will be described. FIG. 3 is a circuit diagram of the optical sensor 1. FIG. 4 is a circuit diagram of a part of the detection area. FIG. 4 also shows the circuit configuration of the detection circuit 48.

As shown in FIG. 3, the light receiving part 10 includes a plurality of partial detection areas PAA arranged in a matrix. Each of the partial detection areas PAA includes a photosensor 30.

The gate line GCL extends in the first direction Dx and is connected to the plurality of partial detection areas PAA arranged in the first direction Dx. Further, the gate lines GCL(1), GCL(2), . . . and GCL(8) are arranged in the second direction Dy and connected to the gate line driving circuit 15.

In the following description, when it is not necessary to separately describe the gate lines GCL(1), GCL(2), . . . and GCL(8), they are simply referred to as gate lines GCL. For purposes of illustrative clarity, FIG. 3 shows eight gate lines GCL, which is merely an example, and the gate lines GCL may be M lines (M is 8 or more, e.g., M=256).

The signal line SGL extends in the second direction Dy and is connected to the photosensors 30 of the plurality of partial detection areas PAA arranged in the second direction Dy. Further, the plurality of signal lines SGL(1), SGL(2), . . . and SGL(12) are arranged in the first direction Dx and connected to the signal line selecting circuit 16 and the reset circuit 17. In the following description, when it is not necessary to separately describe the signal lines SGL(1), SGL(2), . . . and SGL(12), the signal lines SGL are simply referred to as signal lines SGL.

For purposes of illustrative clarity, twelve signal lines SGL are shown, but this is merely an example and the signal lines SGL may be N lines (N is equal to or greater than 12, e.g., N=252). For example, the resolution of the sensor is 508 dpi (dot per inch), and the cell count is 252×256. In FIG. 3, the light receiving part 10 is disposed between the signal line selecting circuit 16 and the reset circuit 17. Without being limited thereto, the signal line selecting circuit 16 and the reset circuit 17 may be connected to the end of the signal line SGL in the same direction.

The gate line driving circuit 15 receives control signals such as the start signal STV, the clock signal CK, and the reset signal RST1 from the detection control unit 11. The gate line driving circuit 15 sequentially selects a plurality of gate lines GCL(1), GCL(2), . . . and GCL(8) in a time-division manner based on the control signals. The gate line driving circuit 15 supplies the gate drive signal Vgcl to the selected gate line GCL. In this manner, the gate drive signal Vgcl is supplied to a plurality of first switching elements Tr connected to the gate line GCL, and the plurality of partial detection areas PAA arranged in the first direction Dx are selected as detection targets.

The gate line driving circuit 15 may perform different driving for each detection mode of a fingerprint and the detection of different items of biological information (e.g., pulse wave, pulse, blood vessel image, blood oxygen saturation). For example, the gate line driving circuit 15 may drive a plurality of gate lines GCL collectively.

Specifically, the gate line driving circuit 15 may simultaneously select a predetermined number of gate lines GCL among the gate lines GCL(1), GCL(2), . . . and GCL(8) based on the control signal. For example, the gate line driving circuit 15 may simultaneously select gate lines GCL (1) to (6) and supplies thereto the gate-drive-signal Vgcl. The gate line driving circuit 15 supplies the gate drive signals Vgcl to the plurality of first switching elements Tr through the selected six gate lines GCL. In this manner, the group areas PAG1 and PAG2 each including the plurality of partial detection areas PAA arranged in the first direction Dx and the second direction Dy are selected as the detection targets. The gate line driving circuit 15 collectively drives a predetermined number of gate lines GCL, and sequentially supplies the gate drive signals Vgcl to each predetermined number of gate lines GCL. In the following, when the positions of the different group areas such as the group areas PAG1 and PAG2 are not particularly distinguished from each other, each of the group areas are called group area PAG.

The signal line selecting circuit 16 includes a plurality of selection signal lines Lsel, a plurality of output signal lines Lout, and second switching elements TrS. The plurality of second switching elements TrS are provided so as to respectively correspond to the signal lines SGL. Six signal lines SGL(1), SGL(2), . . . and SGLs (6) are connected to a common output signal line Lout1. Six signal lines SGL(7), SGL(8), . . . and SGL(12) are connected to a common output signal line Lout2. The output signal lines Lout1 and Lout2 are connected to the detection circuit 48.

The signal lines SGL (1), SGL (2), . . . and SGL (6) are grouped into a first signal line block, and the signal lines SGL (7), SGL (8), . . . and SGL (12) are grouped into a second signal line block. The selection signal lines Lsel are respectively connected to the gates of the second switching elements TrS included in one of the signal line blocks. One of the selection signal lines Lsel is connected to the gates of the second switching elements TrS in the signal line blocks.

Specifically, the selection signal lines Lsel1, Lsel2, . . . , and Lsel6 are connected to the second switching elements TrS respectively corresponding to the signal lines SGL(1), SGL(2), . . . and SGL(6). The selection signal line Lsel1 is connected to the second switching element TrS corresponding to the signal line SGL(1) and the second switching element TrS corresponding to the signal line SGL(7). The selection signal line Lsel2 is connected to the second switching element TrS corresponding to the signal line SGL(2) and the second switching element TrS corresponding to the signal line SGL(8).

The detection control unit 11 sequentially supplies the selection signal ASW to the selection signal lines Lsel. Through the operations of the second switching elements TrS, the signal line selecting circuit 16 sequentially selects the signal lines SGL in one of the signal line blocks in a time-division manner. The signal line selecting circuit 16 selects one of the signal lines SGL in each of the signal line blocks. With such a configuration, the optical sensor 1 can reduce the number of ICs (Integrated Circuit) including the detection circuit 48 or the number of terminals of the ICs.

The signal line selecting circuit 16 may collectively connect the signal lines SGL with the detection circuit 48. Specifically, the detection control unit 11 simultaneously supplies the selection signal ASW to the selection signal lines Lsel. With this operation, the signal line selecting circuit 16 selects a plurality of signal lines SGL (e.g., six signal lines SGL) in one of the signal line blocks by the operation of the second switching element TrS, and connects the signal lines SGL with the detection circuit 48. As a result, a signal detected in each group region PAG is output to the detection circuit 48. In this case, signals from the partial detection areas PAA (photosensors 30) are put together per group area PAG and output to the detection circuit 48.

The gate line driving circuit 15 and the signal line selecting circuit 16 operate to perform the detection for each group area PAG. This improves the intensity of the first detection signal Vdet obtained by one time of detection, thereby improving the sensor sensitivity. This also reduces the time required for the detection. As such, the optical sensor 1 can repeatedly perform the detection in a short time, and thus, can improve the S/N ratio and accurately detect a change in the biological information, such as the pulse wave, with time.

The reset circuit 17 includes a reference signal line Lvr, a reset signal line Lrst, and third switching elements TrR. The third switching elements TrR correspond to the plurality of signal lines SGL. The reference signal line Lvr is connected to either the sources or the drains of the third switching elements TrR. The reset signal line Lrst is connected to the gates of the third switching elements TrR.

The detection control unit 11 supplies the reset signal RST2 to the reset signal line Lrst. This turns on the third switching elements TrR to electrically connect the signal lines SGL to the reference signal line Lvr. The power supply circuit 28 supplies a reference signal COM to the reference signal line Lvr. This operation supplies the reference signal COM to an additional capacitance Cad (see FIG. 4) included in the partial detection areas PAA.

As shown in FIG. 4, each of the partial detection areas PAA includes a photosensor 30, an additional capacitance Cad, and a first switching element Tr. FIG. 4 shows two gate lines GCL(m) and GCL(m+1) arranged in the second direction Dy among the plurality of gate lines GCL. FIG. 4 also shows two signal lines SGL(n) and SGL(n+1) arranged in the first direction Dx among the plurality of signal lines SGL. The partial detection area PAA is an area surrounded by the gate line GCL and the signal line SGL. The first switching element Tr corresponds to the photosensor 30. The first switching element Tr is composed of a thin film transistor TFT (see FIG. 5), and in this embodiment, includes an n-channel MOS (metal oxide semiconductor) type TFT.

The gates of the first switching elements Tr belonging to the partial detection areas PAA arranged in the first direction Dx are connected to the gate line GCL. The sources of the first switching elements Tr belonging to the partial detection areas PAA arranged in the second direction Dy are connected to the signal line SGL. The drain of the first switching element Tr is connected to the cathode of the photosensor 30 and the additional capacitance Cad.

The power supply circuit 28 supplies the sensor power supply signal VDDSNS to the anode of the photosensor 30. Further, the power supply circuit 28 supplies the reference signal COM, which is the initial potential of the signal line SGL and the additional capacitance Cad, to the signal line SGL and the additional capacitance Cad.

When the partial detection area PAA is irradiated with light, a current corresponding to the amount of the light flows through the photosensor 30, whereby electric charges are accumulated in the additional capacitance Cad. When the first switching element Tr is turned on, a current flows through the signal line SGL in accordance with the charges accumulated in the additional capacitance Cad. The signal line SGL is connected to the detection circuit 48 via the second switching element TrS of the signal line selecting circuit 16. This allows the optical sensor 1 to detect a signal corresponding to the amount of light irradiated to the photosensor 30 for each partial detection area PAA or for each group area PAG.

The detection signal amplification unit 42 of the detection circuit 48 converts a variation of a current supplied from the signal lines SGL into a variation of a voltage, and amplifies the result. A reference potential Vref having a fixed potential is supplied to the non-inverting input unit (+) of the detection signal amplification unit 42. The signal line SGL is connected to the inverting input terminal (−) when the output switch SSW is in the ON state. The same signal as the reference signal COM is supplied as a reference potential Vref. The detection signal amplification unit 42 includes a capacitive element Cb and a reset switch RSW. When the signal reading for one row is completed, the reset switch RSW is turned on, and an electrical charge of the capacitive element Cb is reset.

Figure 5:
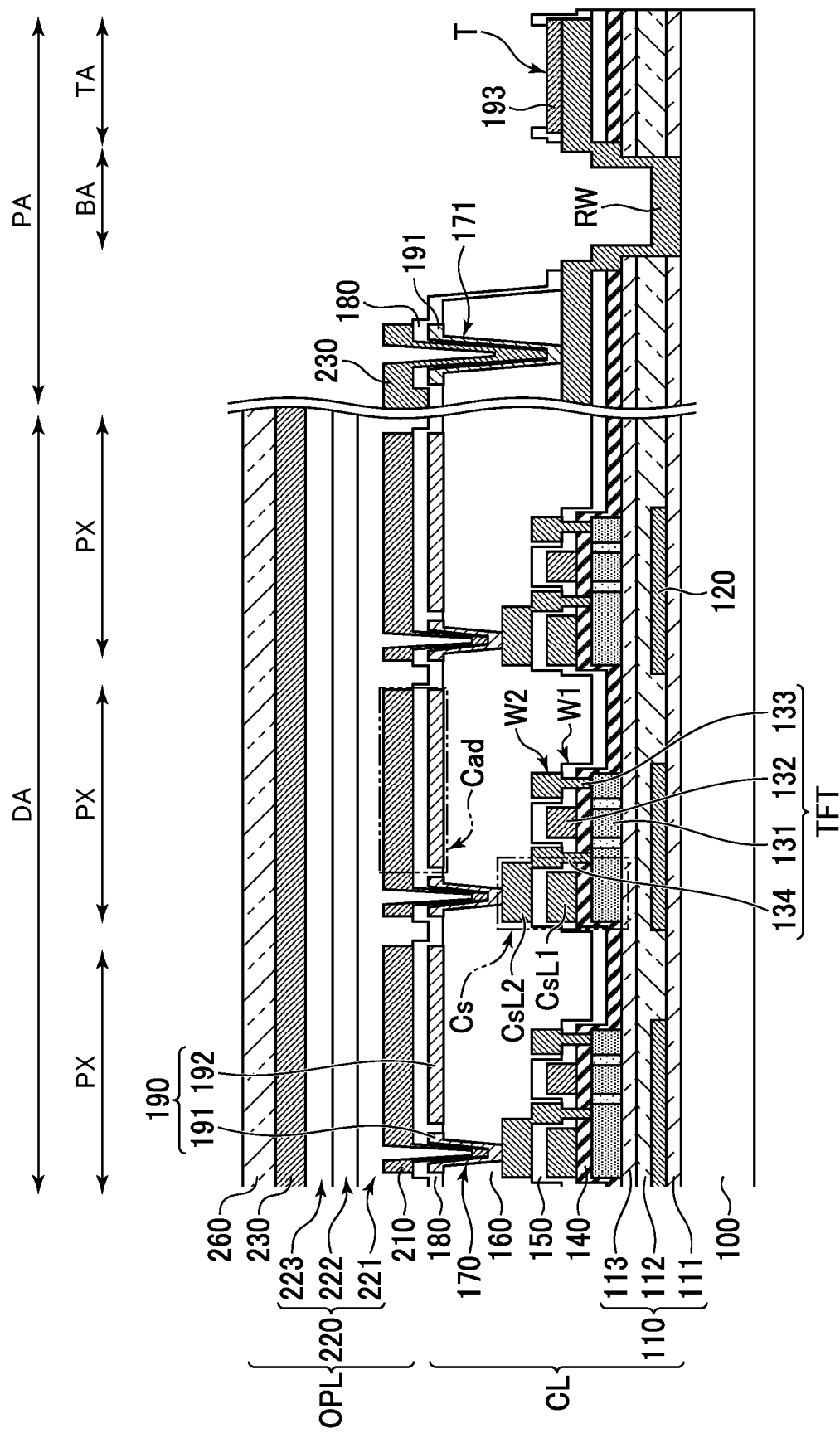
FIG. 5 is a partial sectional view of the optical sensor taken along the line V-V of FIG. 1.

Next, a cross-sectional configuration of the optical sensor 1 will be described. FIG. 5 is a partial sectional view of the optical sensor 1 taken along the line V-V of FIG. 1 in the first embodiment. In FIG. 5, a louver film 600 (described later) is omitted. In FIG. 5, a part of the detection area DA and a part of the frame area PA are shown in a cross-sectional view. As described above, the detection area DA has a plurality of pixels PX, and the frame area PA has a bending area BA and a terminal area TA. Each pixel PX has one corresponding lower electrode 210 and one corresponding thin film transistor TFT. A circuit layer CL includes layers from a barrier inorganic film 110 to an inorganic insulating film 180, and an organic photoelectric conversion layer OPL includes layers from a lower electrode 210 to an upper electrode 230.

FIG. 5 shows the cross section in the second direction Dy, although in the detection area DA, if the optical sensor is cut in the first direction Dy, the same cross-sectional structure as in FIG. 4 is seen. In FIG. 5, hatching is omitted in some layers to facilitate a view of the cross-sectional structure.

In the following, the laminated structure of layers from the resin substrate 100 to the sealing film 260 will be described in order from the lower layer. First, the circuit layer CL provided on the resin substrate 100 will be described.

The barrier inorganic film 110 is laminated on the resin substrate 100. The resin substrate 100 is made of polyimide. In this regard, if the resin substrate 100 has sufficient flexibility as the sheet-type optical sensor, any resin material may be used. The barrier inorganic film 110 has a three-layer structure of a first inorganic film 111 (e.g., silicon oxide film), a second inorganic film 112 (e.g., silicon nitride film), and a third inorganic film 113 (e.g., silicon oxide film). The first inorganic film 111 is provided in order to improve the adhesion to the base material, the second inorganic film 112 is provided as a film to block moisture and impurities from the outside, and the third inorganic film 113 is provided as a film to prevent hydrogen atoms contained in the second inorganic film 112 from diffusing to the semiconductor layer 131. However, the structure is not particularly limited thereto. The structure may include another layer, or may be formed of a single layer or double layers.

The additional film 120 may be formed at a portion where the thin film transistor TFT to be described later is formed. The additional film 120 can prevent a change in characteristics of the thin film transistor TFT due to penetration of light from the back surface of the channel of the thin film transistor TFT or provide a predetermined potential by being formed of a conductive material, thereby providing a back gate effect to the thin film transistor TR. Here, after the first inorganic film 111 is formed, the additional film 120 is formed in an island shape in accordance with the portion where the thin film transistor TFT is formed, and then the second inorganic film 112 and the third inorganic film 113 are laminated, so that the additional film 120 is sealed in the barrier inorganic film 110. In this regard, the present invention is not limited thereto, and the additional film 120 may be formed on the resin substrate 100 and then the barrier inorganic film 110 may be formed.

A thin film transistor TFT is formed on each pixel PX on the barrier inorganic film 110. The thin film transistor TFT includes a semiconductor layer 131, a gate electrode 132, a source electrode 133, and a drain electrode 134. Here, a polysilicon thin film transistor is taken as an example, and only an Nch transistor is shown, although a Pch transistor may also be formed. The semiconductor layer 131 of the thin film transistor TFT has a structure in which a low-concentration impurity region or an intrinsic semiconductor region is provided between a channel region and a source/drain region. The gate electrode 132 is a portion where the gate line GCL is electrically connected to the semiconductor layer 131 in each pixel PX. Similarly, the source electrode 133 is a portion where the signal line SGL is electrically connected to the semiconductor layer 131 in each pixel PX.

A gate insulating film 140 is provided between the semiconductor layer 131 and the gate electrode 132. Here, a silicon oxide film is used as the gate insulating film 140. The gate electrode 132 is a part of the first wiring layer W1 formed of MoW. The first wiring layer W1 includes a first holding capacitance line CsL1 in addition to the gate electrode 132. A part of the holding capacitor Cs is formed between the first holding capacitance line CsL1 and the semiconductor layer 131 (source/drain regions) via the gate insulating film 140.

An interlayer insulating film 150 is formed on the gate electrode 132. The interlayer insulating film 150 has a structure in which a silicon nitride film and a silicon oxide film are laminated. The films from the barrier inorganic film 110 to the interlayer insulating film 150 are patterned and removed at the area corresponding to the bending area BA. The polyimide forming the resin substrate 100 is exposed in the area corresponding to the bending area BA. When the barrier inorganic film 110 is patterned to be removed, the surface of the polyimide may be partially eroded or lost.

A wiring pattern is formed under each of the step at the edge of the interlayer insulating film 150 and the step at the edge of the barrier inorganic film 110. A routing wire RW is disposed over the wiring pattern when crossing the steps. For example, the gate electrode 132 is disposed between the interlayer insulating film 150 and the barrier inorganic film 110, and the additional film 120 is disposed between the barrier inorganic film 110 and the resin substrate 100. As such, the wiring pattern is formed using such layers.

A second wiring layer W2, which includes a portion serving as the source electrode 133, the drain electrode 134, and the routing wire RW, is formed on the interlayer insulating film 150. Here, a three-layer laminated structure of Ti, Al, and Ti is employed. The first holding capacitance line CsL1 (a part of the first wiring layer W1) and the second holding capacitance line CsL2 (a part of the second wiring layer W2) form another part of the holding capacitor Cs via the interlayer insulating film 150. The routing wire RW extends to the terminal area TA via the bending area BA and forms a terminal portion T to which the flexible printed substrate 300 is connected, for example.

The routing wire RW is formed so as to reach the terminal portion T across the bending area BA, and thus crosses the steps of the interlayer insulating film 150 and the barrier inorganic film 110. As described above, the wiring pattern formed by the additional film 120, for example, is formed in the steps. As such, even if the routing wire RW is disconnected at the recess of the step, the electrical connection can be maintained by contacting the wiring pattern.

A flattening film 160 is disposed so as to cover the source electrode 133, the drain electrode 134, and the interlayer insulating film 150. The flattening film 160 is made of resin, such as photosensitive acryl, because such a material is superior in surface flatness to an inorganic insulating material formed by CVD (chemical vapor deposition), for example. The flattening film 160 is removed in a pixel contact portion 170, an upper electrode contact portion 171, the bending area BA, and the terminal area TA.

A transparent conductive film 190 made of indium tin oxide (ITO) is formed on each pixel PX on the flattening film 160. The transparent conductive film 190 includes a first transparent conductive film 191 and a second transparent conductive film 192, which are separated from each other.

In the pixel contact portion 170, the first transparent conductive film 191 is electrically connected to the second wiring layer W2, a surface of which is exposed by removal of the flattening film 160. The second transparent conductive film 192 is disposed below a lower electrode 210 to be described later (further below the inorganic insulating film 180) and next to the pixel contact portion 170. The inorganic insulating film 180 (silicon nitride film) is disposed on the transparent conductive film 190 and the flattening film 160 so as to cover the first transparent conductive film 191 except for the opening of the pixel contact portion 170.

The second transparent conductive film 192, the inorganic insulating film 180, and the lower electrode 210 overlap each other in a plan view and whereby the additional capacitance Cad is formed.

The transparent conductive film 190 may also be formed on the surface of the terminal portion T to serve as a third transparent conductive film 193. The third transparent conductive film 193 formed on the surface of the terminal portion T may be provided for the purpose of protecting the exposed wiring portion from a damage in a process subsequent to forming the third transparent conductive film 193.

A lower electrode 210 is provided for each pixel PX on the inorganic insulating film 180 so as to be electrically connected to the drain electrode 134 through the opening of the inorganic insulating film 180 in the pixel contact portion 170. The lower electrode 210 is formed as a reflective electrode and has a three-layer structure of an indium zinc oxide film, an Ag film, and an indium zinc oxide film. An indium tin oxide film may be used instead of the indium zinc oxide film. The lower electrode 210 extends laterally from the pixel contact portion 170 and above the thin film transistor TFT.

An organic material layer 220 is disposed on the lower electrode 210. The organic material layer 220 includes, in order from the bottom, a lower carrier transport layer 221, an organic light-receiving layer 222, and an upper carrier transport layer 223. When the front surface irradiation structure is employed, the lower carrier transport layer 221 is an electron transport layer and the upper carrier transport layer 223 is an electron transport layer. When the back surface irradiation structure is employed, the lower carrier transport layer 221 is an electron transport layer and the upper carrier transport layer 223 is a hole transport layer. The organic light-receiving layer 222 may be formed by vapor deposition or by coating on a solvent dispersion. Here, the organic light-receiving layer 222 is formed over the entire surface covering the detection area DA, but not limited thereto.

The upper electrode 230 is formed in common to the pixels PX on the organic material layer 220. When the front surface irradiation structure is employed, the upper electrode 230 needs to be transparent. Here, PEDOT:PSS is formed on the surface in contact with the organic material layers 220, and then the upper electrode 230 is formed using a metallic material, such as Ag and Al, as a thin film that allows incident light to transmit. The upper electrode 230 is formed over the organic material layer 220 disposed on the detection area DA and the upper electrode contact portion 171 disposed on the frame area PA. The upper electrode 230 is electrically connected to the routing wire RW of the second wiring layer W2 in the upper electrode contact portion 171, and eventually extracted to the terminal portion T.

The sealing film 260 is formed on the upper electrode 230. One of the functions of the sealing film 260 is to protect the organic material layer 220 from moisture entering from the outside, and is required to have a high gas barrier property. Here, the sealing film 260 has a laminate structure including a silicon nitride film, and includes a silicon nitride film, an organic resin, and a silicon nitride film. A silicon oxide film or an amorphous silicon layer may be provided between the silicon nitride film and the organic resin to improve adhesion. In this regard, such a film is provided on the light-receiving surface side, and thus, it is preferable that the materials do not absorb or otherwise act on light of the wavelength to be detected.

Figure 6A:
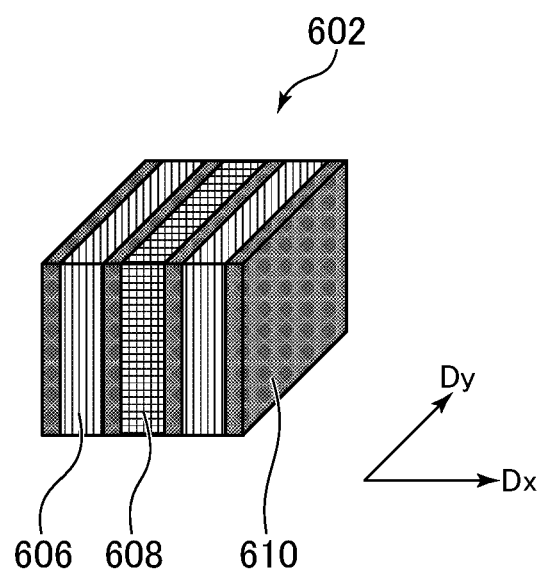
FIGS. 6A and 6B are schematic diagrams illustrating a first layer and a second layer of a louver film according to the first embodiment.
Figure 6B:
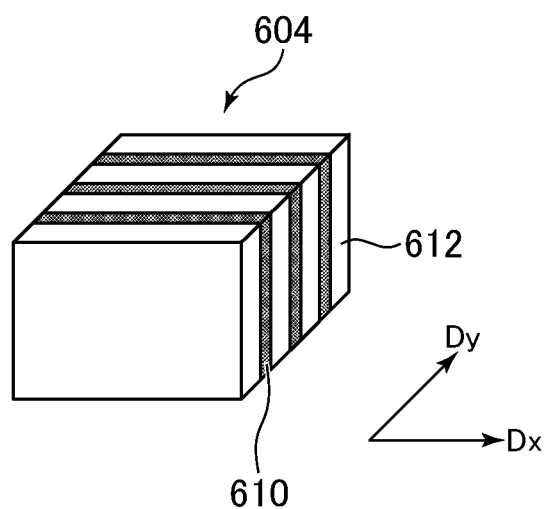
Figure 7:
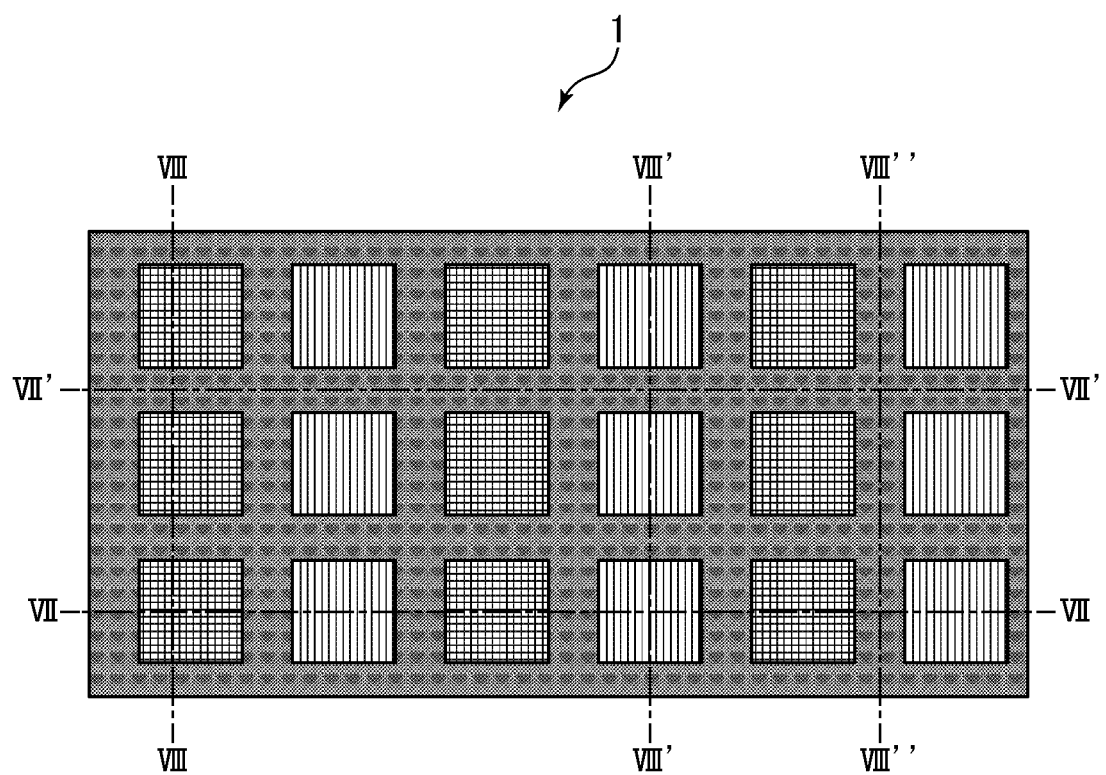
FIG. 7 is a plan view of the optical sensor for illustrating the wavelength of transmitted light.
Figure 7:
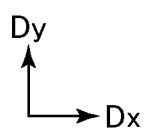
Figure 8A:
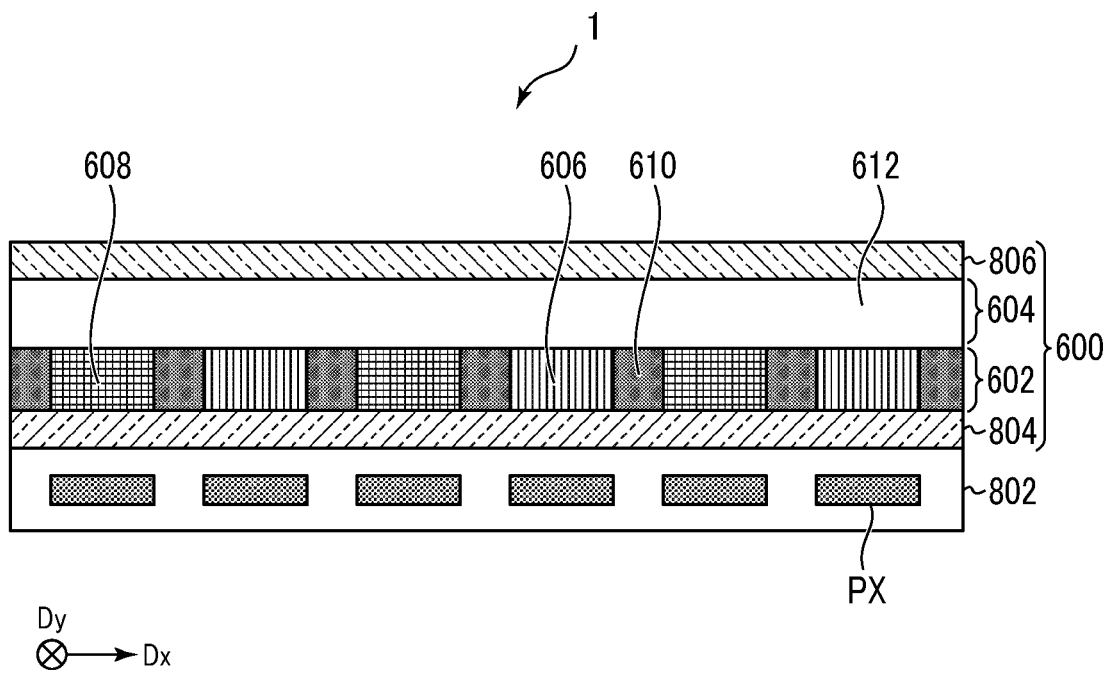
FIGS. 8A and 8B are schematic diagrams showing cross sections of respective portions in FIG. 7.
Figure 8B:
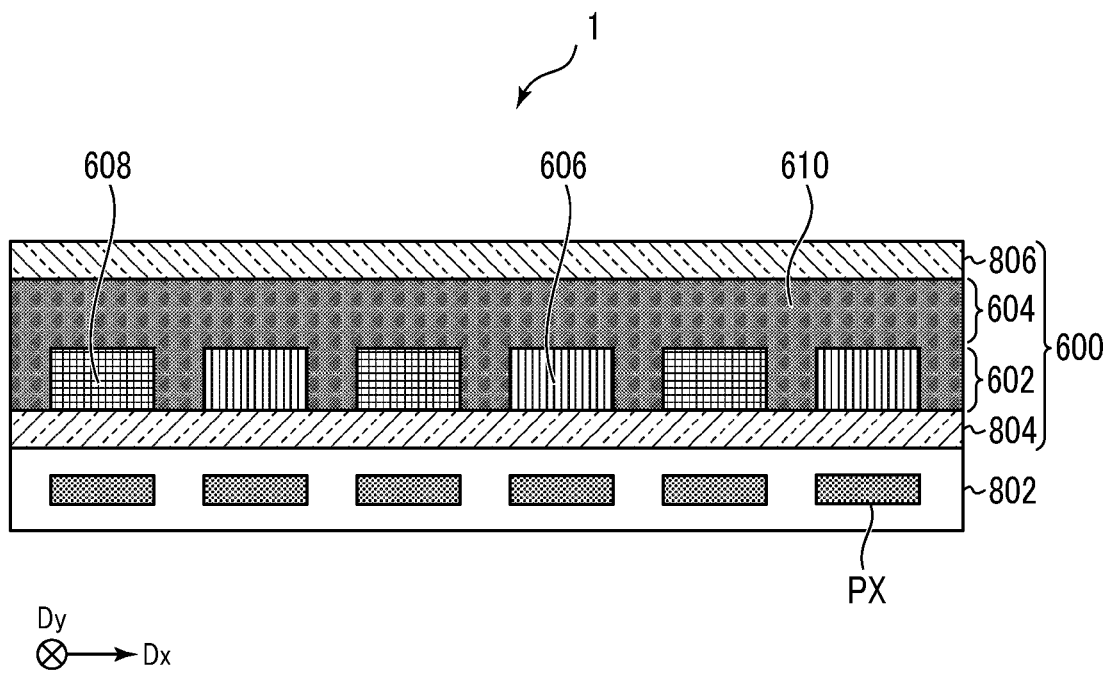
Figure 9A:
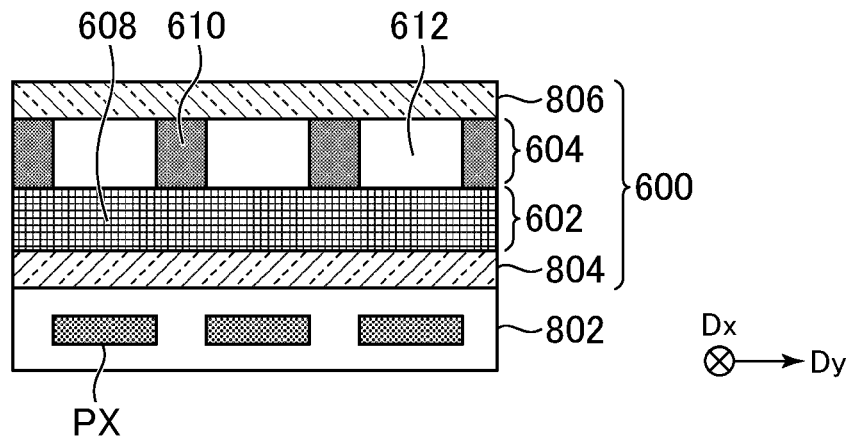
FIGS. 9A to 9C are schematic diagrams showing cross sections of respective portions in FIG. 7.
Figure 9B:
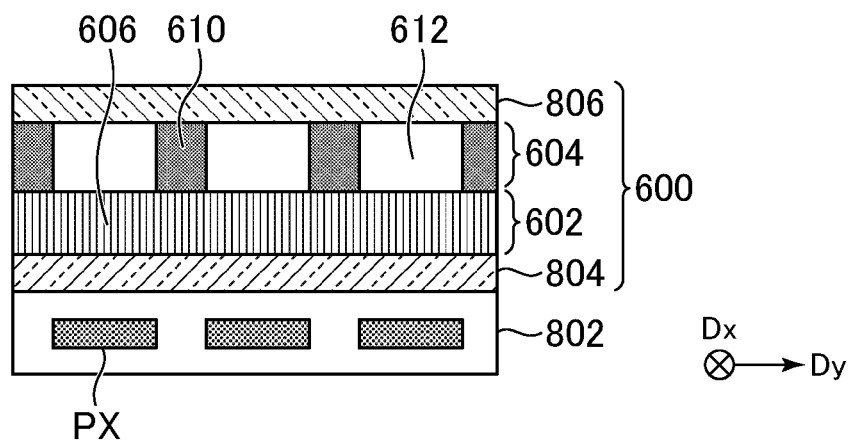
Figure 9C:
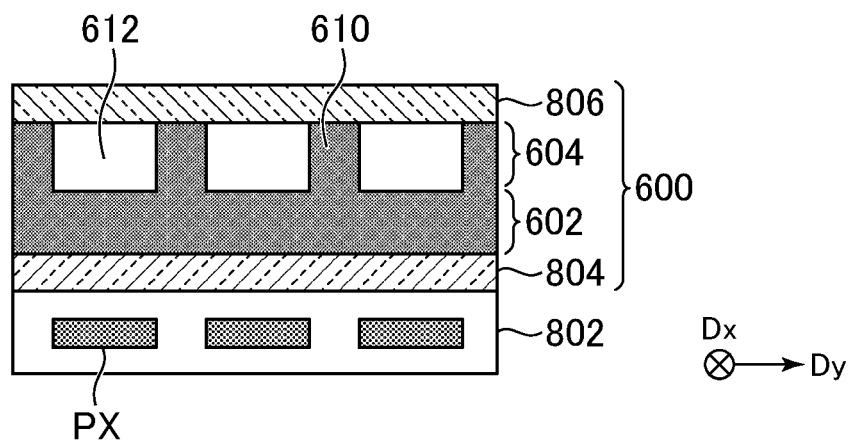

Next, the louver film 600 according to the first embodiment will be described referring to FIGS. 6A to 9C. FIG. 6A schematically shows only a first layer 602 of the louver film 600, and FIG. 6B schematically shows only a second layer 604 of the louver film 600. FIG. 7 is a plan view of the optical sensor 1 for illustrating the wavelength of the transmitted light. FIG. 8A is a schematic diagram showing the VII-VII cross-section of FIG. 7. FIG. 8B is a schematic diagram showing the VII'-VII' cross-section of FIG. 7. FIG. 9A is a schematic diagram showing the VIII-VIII cross-section of FIG. 7. FIG. 9B is a schematic diagram showing the VIII'-VIII' cross-section of FIG. 7. FIG. 9C is a schematic diagram showing the VIII"-VIII" cross-section of FIG. 7.

FIG. 7 only shows a part of the optical sensor 1, and the wavelength of the light transmitted through the louver film 600 is represented by hatching lines. The layers shown in FIG. 5 are omitted in FIGS. 8A to 9C, and only the pixels PX are shown so that the positional relationship between the transmissive portion of the louver film 600 and the pixels PX is visible. The sensor unit 802 includes the resin substrate 100 to the sealing film 260 in FIG. 5.

The louver film 600 is formed of a first adhesive layer 804, the first layer 602, the second layer 604, and a second adhesive layer 806, which are laminated in this order. Specifically, for example, the first adhesive layer 804 is disposed on the sealing film 260 to cover the sealing film 260. The second adhesive layer 806 is disposed on the second layer 604 to cover the second layer 604. The first adhesive layer 804 and the second adhesive layer 806 are optical clear adhesive (OCA). The first adhesive layer 804 and the second adhesive layer 806 are formed of a material that transmits the entire wavelength region of visible light and infrared rays.

The first layer 602 and the second layer 604 each include a transmissive portion and a light shielding portion 610. Specifically, the first layer 602 is formed of the transmissive portion that transmits light of a predetermined wavelength band and the light shielding portion 610 that shields light, which are alternately disposed in the first direction Dx. The second layer 604 is formed of the transmissive portion that transmits light of a predetermined wavelength band and the light shielding portion 610 that shields light, which are alternately disposed in the second direction Dy.

The transmissive portion included in either the first layer 602 or the second layer 604 includes a first wavelength selecting unit 606 that transmits light of the first wavelength band and a second wavelength selecting unit 608 that transmits light of the second wavelength band. Specifically, as shown in FIG. 6A, the transmissive portion included in the first layer 602 includes the first wavelength selecting unit 606 that transmits only light of the first wavelength band (e.g., 640 nm to 680 nm centered on 660 nm) and the second wavelength selecting unit 608 that transmits only light of the second wavelength band (e.g., 830 nm to 870 nm centered on 850 nm). The first wavelength selecting unit 606 and the second wavelength selecting unit 608 included in the transmissive portion of the first layer 602 are alternately arranged along the first direction Dx with the light shielding portion 610 interposed therebetween. All of the transmissive portions 612 included in the second layer 604 are formed of a material that transmits the entire wavelength region of visible light and infrared rays. The light shielding portion 610 is formed of a material that shields visible light and infrared rays. Specifically, the light shielding portion 610 is formed of a resin that shields light having a wavelength of at least 300 nm to 3 μm, for example.

That is, in the cross section shown in FIG. 8A, the first wavelength selecting unit 606 and the second wavelength selecting unit 608 are alternately disposed in the first layer 602 with the light shielding unit 610 interposed therebetween, and the transmissive portion 612 is disposed in the second layer 604. In the cross section shown in FIG. 8B, the first wavelength selecting unit 606 and the second wavelength selecting unit 608 are alternately disposed in the first layer 602 with the light shielding unit 610 interposed therebetween, and the light shielding unit 610 is disposed in the second layer 604.

In the cross section shown in FIG. 9A, the second wavelength selecting unit 608 is disposed in the first layer 602, and the transmissive portion 612, which transmits the entire wavelength region of visible light and infrared rays, and the light shielding unit 610 are alternately disposed in the second layer 604. In the cross section shown in FIG. 9B, the first wavelength selecting unit 606 is disposed in the first layer 602, and the transmissive portion 612, which transmits the entire wavelength region of visible light and infrared rays, and the light shielding unit 610 are alternately disposed in the second layer 604. In the cross section shown in FIG. 9C, the light shielding portion 610 is disposed in the first layer 602, and the transmissive portion 612, which transmits the entire wavelength region of visible light and infrared rays, and the light shielding unit 610 are alternately disposed in the second layer 604.

The transmissive portions included in the first layer 602 and the second layer 604 are disposed at positions corresponding to the pixels. Specifically, as shown in FIGS. 8A to 9C, the transmissive portions included in the first layer 602 and the second layer 604 are disposed directly above the partial detection areas PAA of the pixels. The light shielding portion 610 included in the first layer 602 is disposed between the partial detection areas PAA along the second direction Dy, and the light shielding portion 610 included in the second layer 604 is disposed between the partial detection areas PAA along the first direction Dx.

The height and width of each transmissive portion are formed such that the aspect ratio is 2 or more. Specifically, the height of the first layer 602 and the second layer 604 (i.e., height of each transmissive portion) is 400 μm, for example. The width of the transmissive portions of the first layer 602 and the second layer 604 in the first direction Dx and the second direction Dy is 85 μm, for example. The width of the light shielding portions 610 of the first layer 602 and the second layer 604 in the first direction Dx and the second direction Dy is 85 μm, for example.

As described above, when the height of the first layer 602 is 400 μm and the width of the first wavelength selecting unit 606 in the first direction Dx is 85 μm, the aspect ratio of the first wavelength selecting unit 606 on FIG. 8A (i.e., on the DxDz plane when the height direction is Dz (not shown)) is 4.7. When the height of the second layer 604 is 400 μm and the width of the transmissive portion 612 in the second direction Dy is 85 μm, the aspect ratio of the transmissive portion 612 in FIG. 9A (i.e., on the DyDz plane) is 4.7. Of the light incident on the partial detection area PAA of the pixel from the second adhesive layer 806 side, the component incident from the oblique direction is blocked by the light shielding portion 610, and only the component incident from the vertical direction reaches the partial detection area PAA. Accordingly, the first layer 602 and the second layer 604 function as a collimator. The thickness of the first layer 602 and the second layer 604 and the width of the transmissive portion are not limited to those described above, but it is preferable that the aspect ratio in the DxDz plane of the first wavelength selecting unit 606 and the aspect ratio in the DyDz plane of the transmissive portion 612 of the second layer 604 are from 1 to 10.

Figure 10:
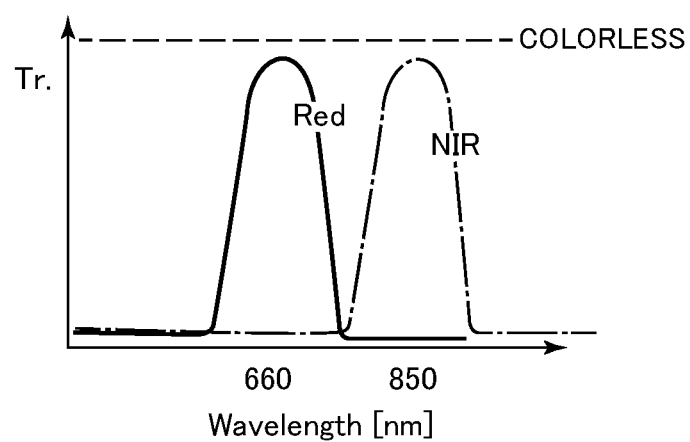
FIG. 10 is a diagram for explaining the transmittance according to the first embodiment.

FIG. 10 is a diagram for explaining the transmittance. In FIG. 10, "Red" indicates the transmittance of the first wavelength selecting unit 606 of the first layer 602, "NIR" indicates the transmittance of the second wavelength selecting unit 608 of the first layer 602, and "colorless" indicates the transmittance of the transmissive portion 612 of the second layer 604. The first wavelength selecting unit 606 of the first layer 602 transmits only light of the first wavelength band (e.g., 640 nm to 680 nm centered on 660 nm). The second wavelength selecting unit 608 of the first layer 602 transmits only light of the second wavelength band (e.g., 830 nm to 870 nm centered on 850 nm). The transmissive portion 612 (colorless in FIG. 10) of the second layer 604 transmits the entire wavelength region of visible light and infrared rays.

Accordingly, as shown in FIG. 7, only light of the first wavelength band (e.g., 640 nm to 680 nm centered on 660 nm) reaches the partial detection area PAA disposed in the area in which the first wavelength selecting unit 606 of the first layer 602 and the transmissive portion 612 of the second layer 604 overlap with each other in a plan view. Only the light of the second wavelength band (e.g., 830 nm to 870 nm centered on 850 nm) reaches the partial detection area PAA disposed in the area in which the second wavelength selecting unit 608 of the first layer 602 and the transmissive portion 612 of the second layer 604 overlap with each other in a plan view. This allows the optical sensor 1 according to the first embodiment to obtain a plurality of types of information on a plurality of wavelengths.

In the above description, a case has been described in which one transmissive portion corresponds to one pixel PX, although one transmissive portion may correspond to a plurality of pixels PX. For example, the number of pixels PX overlapping with one transmissive portion in a plan view may be four of two rows and two columns. A plurality of transmissive portions may correspond to one or more pixels PX. For example, the number of pixels PX overlapping with the four transmissive portions of two rows and two columns in a plan view may be one, or nine of three rows and three columns.

The width of the transmissive portion may be different depending on the wavelength of the transmitted light. Specifically, for example, the photosensor has a lower EQE (External Quantum Efficiency) of near infrared rays than red light, and thus, the width of the second wavelength selecting unit 608 in the first direction Dx and the second direction Dy may be larger than the width of the first wavelength selecting unit 606 in the first direction Dx and the second direction Dy so that the area of the second wavelength selecting unit 608 is larger than that of the first wavelength selecting unit 606.

In the above description, the case has been described in which the first wavelength selecting unit and the second wavelength selecting unit are alternately arranged along the first direction, but may be alternately arranged along the second direction.

As described, the optical sensor 1 including the first wavelength selecting unit 606 and the second wavelength selecting unit 608 enables to obtain a plurality of types of information on a plurality of wavelengths in a short time. The related art also describes sequentially irradiating a measuring object with light of a plurality of wavelength bands at intervals and sensing reflected light and transmitted light from the measuring object, thereby obtaining a plurality of types of information on the measuring object. However, according to the present disclosure, it is possible to obtain a plurality of types of information with a plurality of wavelengths in a short time.

Figure 11A:
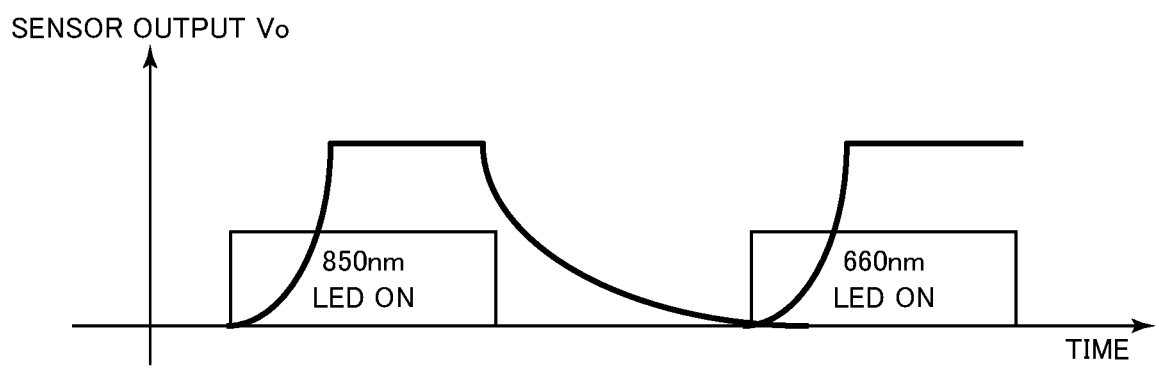
FIGS. 11A and 11B are diagrams showing a temporal change of the sensor output.
Figure 11B:
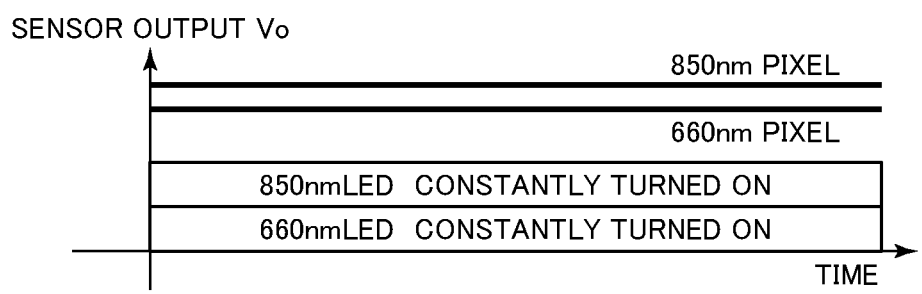

FIG. 11A is a diagram illustrating a time change of the sensor output in the related art (time division), and FIG. 11B is a diagram illustrating a time change of the sensor output in the present disclosure. In FIGS. 11A and 11B, the vertical axis is the sensor output Vo and the horizontal axis is time. It is assumed that the coordinate extracting unit 46 outputs the first detected signal Vdet as the sensor output Vo.

As shown in FIG. 11A, according to the related art, an LED emitting light of 850 nm and an LED emitting light of 660 nm are alternately turned on. The sensor output Vo starts to increase as the LED is turned on and increases to a constant voltage corresponding to the amount of light of the LED and then stabilizes. Subsequently, the sensor outputs Vo that are output from all the partial detection areas PAA are obtained one time (or a predetermined number of times) at a time. The power supply circuit 28 turns off the LED when the reference signal COM is supplied to the additional capacitance Cad (see FIG. 4) included in the partial detection areas PAA.

When the LED is turned off, the sensor output Vo gradually decreases and becomes the initial output voltage value (e.g., 0V) after a certain period of time has elapsed. In order to obtain a plurality of types of information, it is necessary not to mix 850 nm light and 660 nm light sensor outputs Vo. As such, in order to turn on the LED emitting 660 nm light, a certain period of time is required after the LED emitting 850 nm light is turned off. Similarly, in order to turn on the LED emitting 850 nm light, a certain period of time is required after the LED emitting 660 nm light is turned off. In view of this, according to the related art, it takes time to switch the LEDs.

On the other hand, according to the present disclosure, as shown in FIG. 11B, even when the LED emitting 660 nm light and the LED emitting 850 nm light are constantly turned on at the same time, a plurality of types of information can be obtained based on the sensor output Vo of the pixel PX corresponding to the first wavelength selecting unit 606 and the sensor output Vo of the pixel PX corresponding to the second wavelength selecting unit 608. Accordingly, it is possible to improve the detection accuracy per time.

Further, the LED emitting both 660 nm and 850 nm light (e.g., white LED) eliminates the need to provide LEDs that emit light of different wavelengths.

Second Embodiment

Figure 12A:
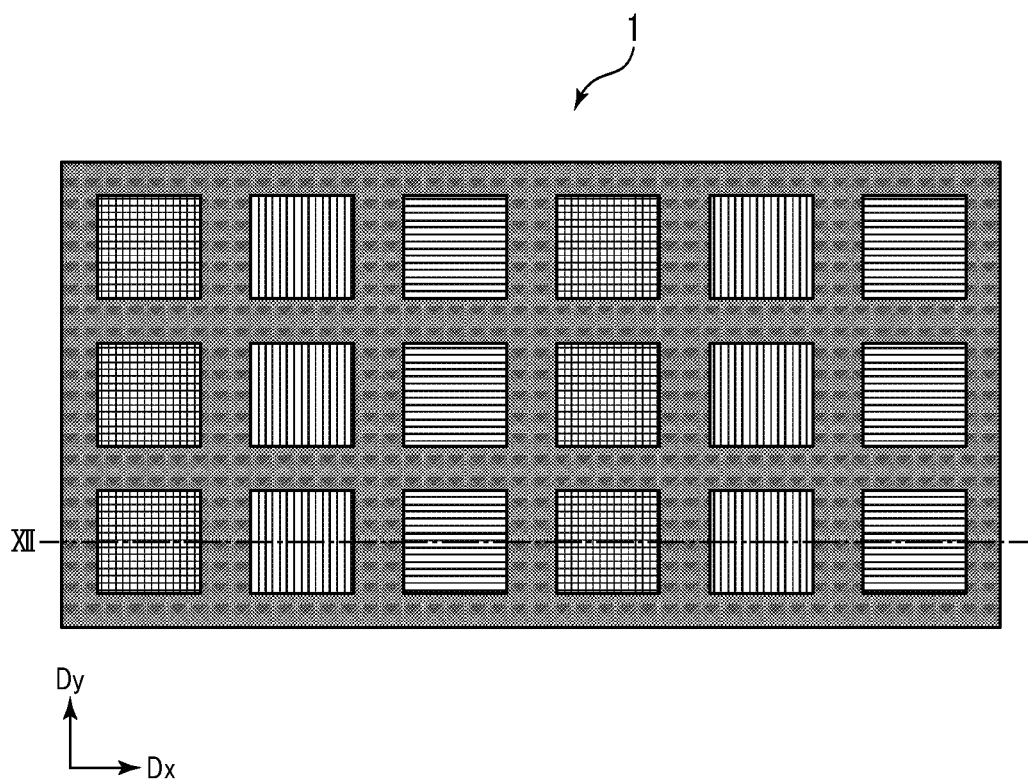
FIGS. 12A and 12B are diagrams for explaining the second embodiment.
Figure 12B:
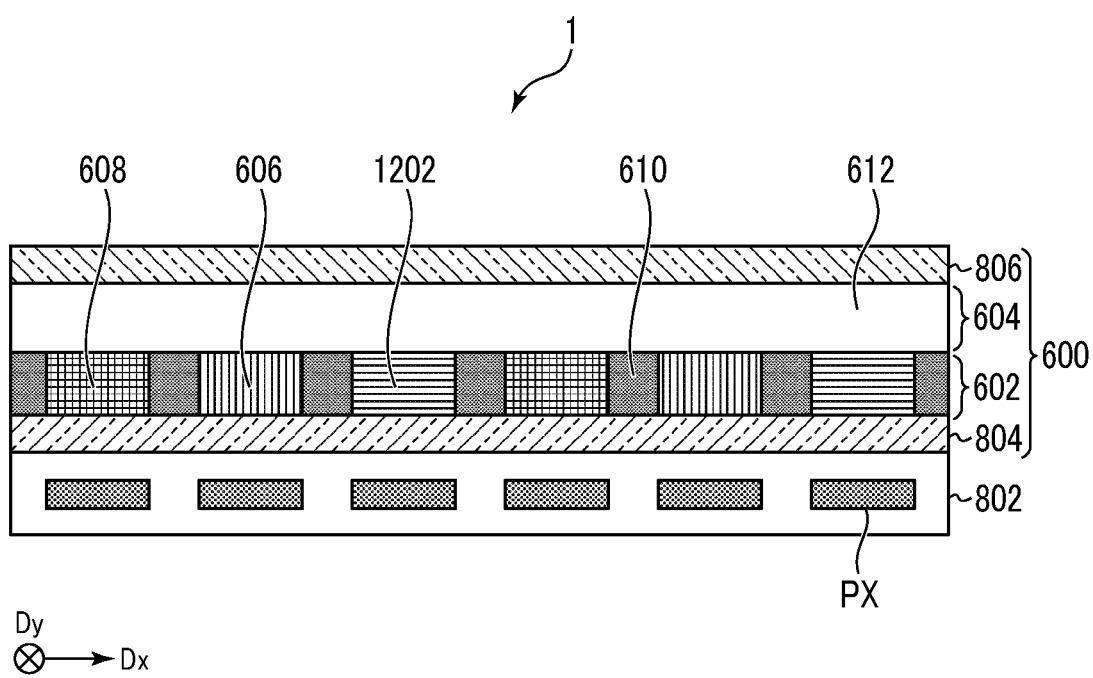

Next, the second embodiment will be described. FIG. 12A is a plan view of the optical sensor 1 for describing the wavelength of transmitted light in the second embodiment. FIG. 12B is a schematic diagram showing the XII-XII cross section.

In the second embodiment, the transmissive portion included in either the first layer 602 or the second layer 604 further includes a third wavelength selecting unit 1202 that transmits light of the third wavelength band. Specifically, for example, in the transmissive portion of the first layer 602, the second wavelength selecting unit 608, the first wavelength selecting unit 606, and the third wavelength selecting unit 1202 are repeatedly arranged in this order along the first direction Dx, and the light shielding portion 610 is disposed between the respective wavelength selecting units. The order may be changed as appropriate. The first wavelength selecting unit 606 and the second wavelength selecting unit 608 are the same as the first wavelength selecting unit 606 and the second wavelength selecting unit 608 in the first embodiment. The third wavelength selecting unit 1202 is, for example, a resin that transmits only light of the third wavelength band (e.g., 535 nm to 575 nm centered on 555 nm). The second embodiment is the same as the first embodiment except that the first layer 602 includes the third wavelength-selecting unit 1202.

According to the second embodiment, three types of information can be obtained by three types of wavelengths. As such, more types of information can be obtained as compared to the first embodiment in the same measurement time.

Third Embodiment

Figure 13A:
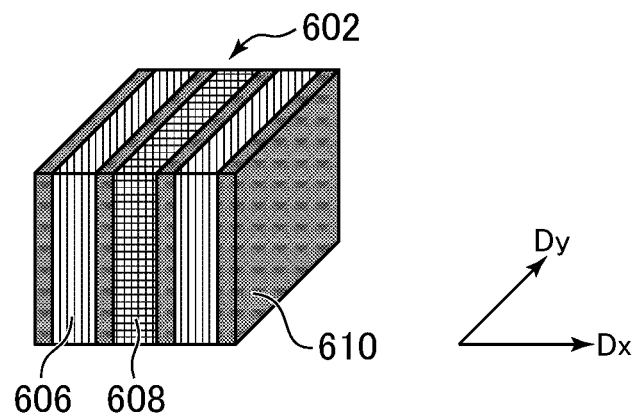
FIGS. 13A to 13D are diagrams for explaining the third embodiment.
Figure 13B:
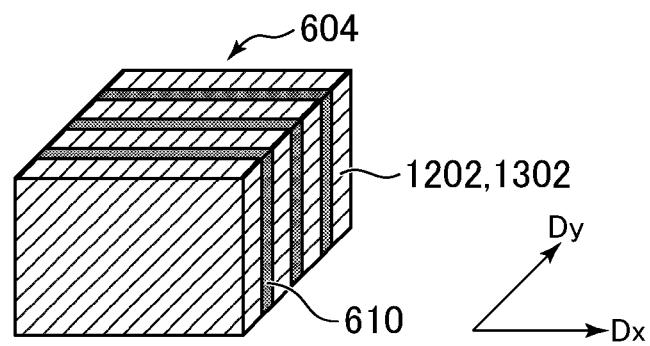
Figure 13C:
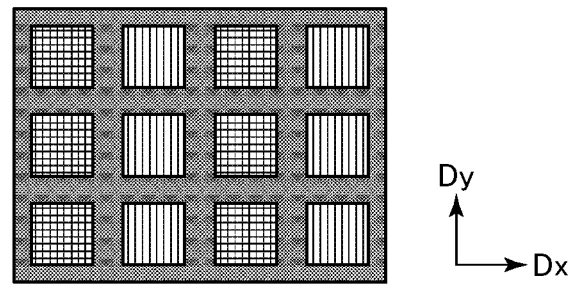
Figure 13D:
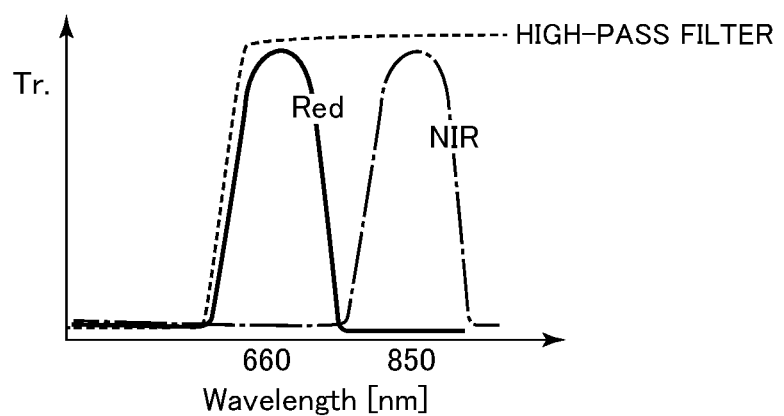

Next, the third embodiment will be described. FIG. 13A is a schematic diagram illustrating only the first layer 602 of the louver film 600 included in the optical sensor 1 according to the third embodiment, and FIG. 13B is a schematic diagram illustrating only the second layer 604. FIG. 13C is a plan view of the optical sensor 1 for illustrating the wavelength of transmitted light. FIG. 13D is a diagram for explaining the transmittance. In FIG. 13D, "Red" indicates the transmittance of the first wavelength selecting unit 606 of the first layer 602, "NIR" indicates the transmittance of the second wavelength selecting unit 608 of the first layer 602, and "high-pass filter" indicates the transmittance of the transmissive portion 612 of the second layer 604.

The transmissive portion included in either the first layer 602 or the second layer 604 in the third embodiment includes the first wavelength selecting unit 606 that transmits light of the first wavelength band and the second wavelength selecting unit 608 that transmits light of the second wavelength band. The transmissive portion included in the other one of the first layer 602 and the second layer 604 includes a third wavelength selecting unit 1202 that transmits light of the third wavelength band. Specifically, the first layer 602 is the same as the first layer 602 in the first embodiment. The second layer 604 is formed of the transmissive portion that transmits light of a predetermined wavelength band and the light shielding portion 610 that shields light, which are alternately disposed in the second direction Dy.

The third wavelength selecting unit 1202 is a filter that transmits both the light of the first wavelength band and the light of the second wavelength band and blocks the light of the predetermined wavelength band other than the first wavelength band and the second wavelength band. Specifically, the transmissive portion of the second layer 604 in the third embodiment is the high-pass filter 1302 as shown in FIG. 13D, and blocks light having a wavelength shorter than 640 nm, for example, and transmits light having a wavelength longer than 640 nm. That is, the high-pass filter 1302 transmits light transmitted through both the first wavelength selecting unit 606 and the second wavelength selecting unit 608 of the first layer 602 and shields light of a wavelength that should be shielded by the first wavelength selecting unit 606 and the second wavelength selecting unit 608 but has been transmitted for some reason.

Similarly to the first embodiment, in the third embodiment, as shown in FIG. 13C, only light of the first wavelength band (e.g., 640 nm to 680 nm centered on 660 nm) reaches the partial detection area PAA disposed in the area in which the first wavelength selecting unit 606 of the first layer 602 and the transmissive portion 612 of the second layer 604 overlap with each other in a plan view. Further, only light of the second wavelength band (e.g., 830 nm to 870 nm centered on 850 nm) reaches the partial detection area PAA disposed in the area in which the second wavelength selecting unit 608 of the first layer 602 and the transmissive portion of the second layer 604 overlap with each other in a plan view.

According to the third embodiment, the high-pass filter 1302 is provided instead of the transmissive portion that transmits the entire wavelength region of visible light and infrared rays in the first embodiment. The light having a wavelength that does not transmit the first wavelength selecting unit 606 and the second wavelength selecting unit 608 is shielded by the high-pass filter 1302, whereby the optical density can be improved.

The transmissive portion provided in the second layer 604 only needs to transmit the wavelength of the light transmitted by the first wavelength selecting unit 606 and the second wavelength selecting unit 608, and thus is not limited to the high-pass filter 1302 and may be a band-pass filter or a low-pass filter.

Fourth Embodiment

Figure 14A:
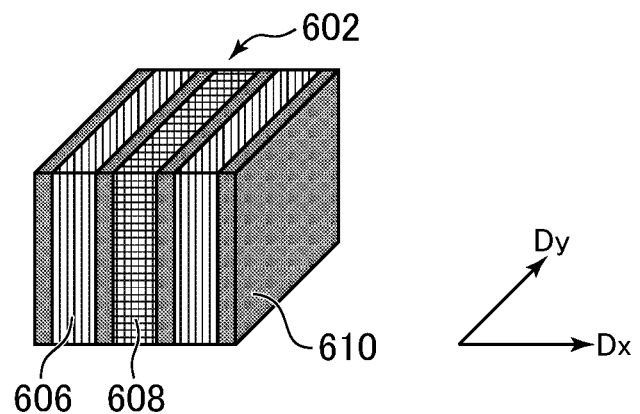
FIGS. 14A to 14D are diagrams for explaining the fourth embodiment.
Figure 14B:
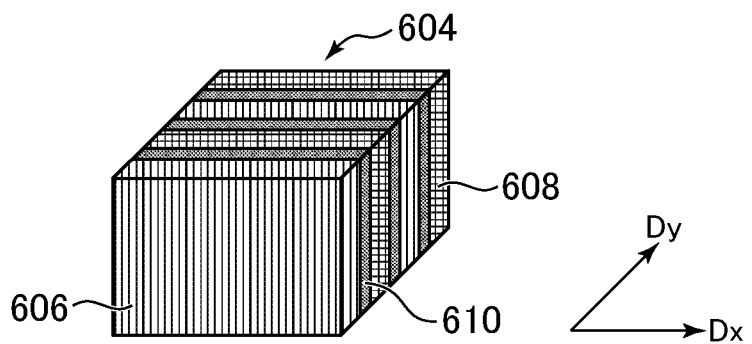
Figure 14C:
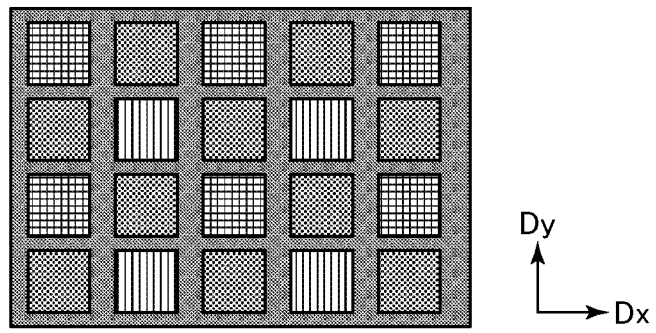
Figure 14D:
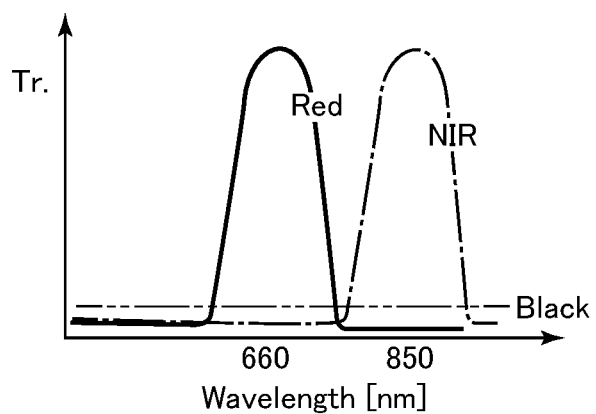

Next, the fourth embodiment will be described. FIG. 14A is a schematic diagram illustrating only the first layer 602 of the louver film 600 included in the optical sensor 1 according to the fourth embodiment, and FIG. 14B is a schematic diagram illustrating only the second layer 604. FIG. 14C is a plan view of the optical sensor 1 for illustrating the wavelength of transmitted light. FIG. 14D is a diagram for explaining the transmittance. "Red" in FIG. 14D indicates the transmittance of the louver film 600 in the area in which the first wavelength selecting unit 606 of the first layer 602 and the first wavelength selecting unit 606 of the second layer 604 overlap with each other in a plan view. "NIR" indicates the transmittance of the louver film 600 in the area in which the second wavelength selecting unit 608 of the first layer 602 and the second wavelength selecting unit 608 of the second layer 604 overlap with each other in a plan view. "Black" indicates the transmittance of the louver film 600 in the area in which the first wavelength selecting unit 606 and the second wavelength selecting unit 608 overlap with each other in a plan view.

The first layer 602 in the fourth embodiment is the same as the first layer 602 in the first embodiment. The second layer 604 is formed of the transmissive portion that transmits light of a predetermined wavelength band and the light shielding portion 610 that shields light, which are alternately disposed in the second direction Dy. The transmissive portion of the second layer 604 includes the first wavelength selecting portion 606 and the second wavelength selecting portion 608, which are alternately arranged along the second direction Dy with the light shielding portion 610 interposed therebetween. That is, the second layer 604 has a configuration obtained by rotating the first layer 602 by 90 degrees in the DxDy plane.

As shown in FIG. 14C, only the light of the first wavelength band (e.g., 640 nm to 680 nm centered on 660 nm) reaches the partial detection area PAA disposed in the area in which the first wavelength selecting unit 606 of the first layer 602 and the first wavelength selecting unit 606 of the second layer 604 overlap with each other in a plan view. That is, only the light of the first wavelength band reaches the partial detection area PAA of the pixels of odd-numbered rows and odd-numbered columns. Only the light of the second wavelength band (e.g., 830 nm to 870 nm centered on 850 nm) reaches the partial detection area PAA disposed in the area in which the second wavelength selecting unit 608 of the first layer 602 and the second wavelength selecting unit 608 of the second layer 604 overlap with each other in a plan view. That is, only the light of the second wavelength band reaches the partial detection area PAA of the pixels of even-numbered rows and even-numbered columns.

Visible light and infrared rays do not reach the partial detection area PAA disposed in the area in which the first wavelength selecting unit 606 of the first layer 602 and the second wavelength selecting unit 608 of the second layer 604 overlap with each other in a plan view. Visible light and infrared rays do not reach the partial detection area PAA disposed in the area in which the second wavelength selecting unit 608 of the first layer 602 and the first wavelength selecting unit 606 of the second layer 604 overlap with each other in a plan view. That is, visible light and infrared rays do not reach the partial detection area PAA of the pixels of even-numbered rows and odd-numbered columns and the partial detection area PAA of the pixels of odd-numbered rows and even-numbered columns.

In the fourth embodiment as well, the pixels of odd-numbered rows and odd-numbered columns and the pixels of even-numbered rows and even-numbered columns are used, which serves to obtain a plurality of types of information with a plurality of wavelengths in a short time. In the fourth embodiment, the first layer 602 and the second layer 604 may be formed of the same material. This reduces the manufacturing cost. A pixel where the visible light and infrared rays do not reach cannot be used as a photosensor, but information of a fingerprint can be obtained as a capacitive sensor.

Fifth Embodiment

Figure 15A:
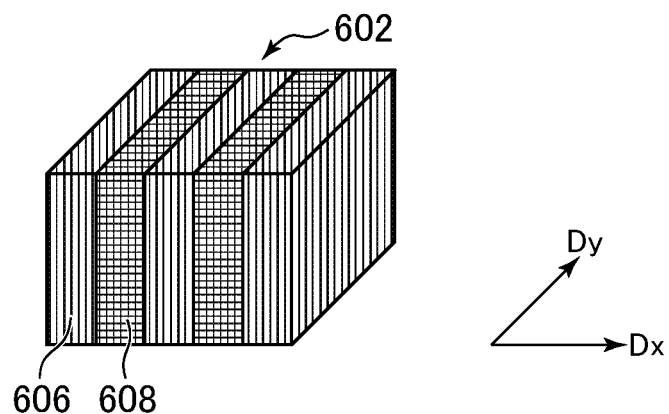
FIGS. 15A to 15D are diagrams for explaining the fifth embodiment.
Figure 15B:
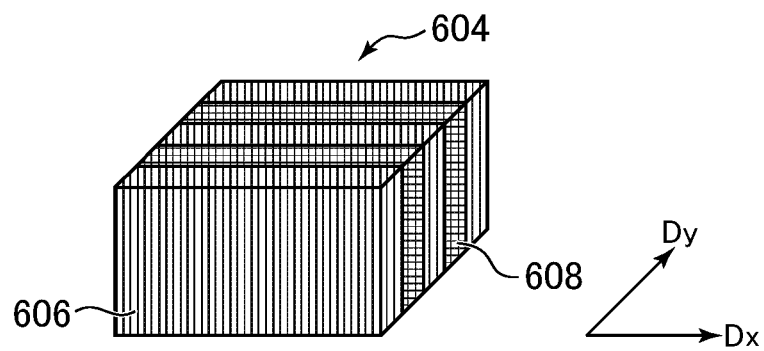
Figure 15C:
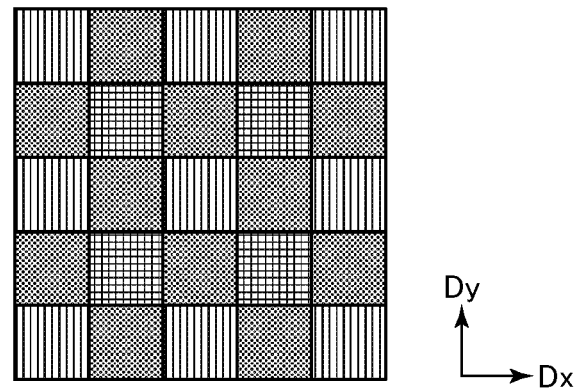
Figure 15D:
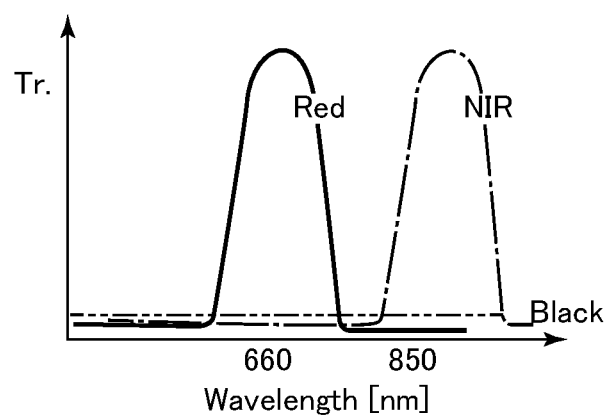

Next, the fifth embodiment will be described. FIG. 15A is a schematic diagram illustrating only the first layer 602 of the louver film 600 included in the optical sensor 1 according to the fifth embodiment, and FIG. 15B is a schematic diagram illustrating only the second layer 604. FIG. 15C is a plan view of the optical sensor 1 for illustrating the wavelength of transmitted light. FIG. 15D is a diagram for explaining the transmittance. "Red" in FIG. 15D indicates the transmittance of the louver film 600 in the area in which the first wavelength selecting unit 606 of the first layer 602 and the first wavelength selecting unit 606 of the second layer 604 overlap with each other in a plan view. "NIR" indicates the transmittance of the louver film 600 in the area in which the second wavelength selecting unit 608 of the first layer 602 and the second wavelength selecting unit 608 of the second layer 604 overlap with each other in a plan view. "Black" indicates the transmittance of the louver film 600 in the area in which the first wavelength selecting unit 606 and the second wavelength selecting unit 608 overlap with each other in a plan view.

The first layer 602 according to the fifth embodiment is formed of the first wavelength selecting unit 606 that transmits light of the first wavelength band and the second wavelength selecting unit 608 that transmits light of the second wavelength band, which are alternately arranged along the first direction Dx. The second layer 604 is formed of the first wavelength selecting unit 606 and the second wavelength selecting unit 608, which are alternately arranged along the second direction Dy.

Specifically, the first layer 602 according to the fifth embodiment has a structure in which the light shielding portion 610 of the first layer 602 in the fourth embodiment is omitted. The second layer 604 according to the fifth embodiment has a structure in which the light shielding portion 610 of the second layer 604 in the fourth embodiment is omitted.

According to the fifth embodiment, similarly to the fourth embodiment, only the light of the first wavelength band reaches the partial detection area PAA of the pixels of odd-numbered rows and odd-numbered columns, and only the light of the second wavelength band reaches the partial detection area PAA of the pixels of even-numbered rows and even-numbered columns. Further, the visible light and infrared rays do not reach the partial detection area PAA of the pixels of even-numbered rows and the odd-numbered columns and the partial detection area PAA of the pixels of odd-numbered rows and even-numbered columns.

Accordingly, even if the light shielding layer is omitted, a plurality of types of information can be obtained with a plurality of wavelengths in a short time by using the pixels of odd-numbered rows and odd-numbered columns and the pixels of even-numbered rows and even-numbered columns. As compared with the fourth embodiment, the sensitivity per pixel can be improved by omitting the light-shielding layer, and the manufacturing cost can also be reduced.

The present invention is not limited to the above embodiment, and various modifications can be made. For example, a replacement can be made with a configuration that is substantially the same as the configuration shown in the above-described embodiment, a configuration that exhibits the same operational effect, or a configuration that can achieve the same object. For example, in the above description, the configuration of the first layer 602 may be replaced with the configuration of the second layer 604.

While there have been described what are at present considered to be certain embodiments of the invention, it will be understood that various modifications may be made thereto, and it is intended that the appended claims cover all such modifications as fall within the true spirit and scope of the invention.

The invention claimed is:

1. An optical sensor comprising:
a light receiving part including a plurality of pixels and receiving light from a measuring object, the pixels being disposed in a matrix along a first direction and a second direction orthogonal to the first direction in a plan view; and
a louver part in which a first layer and a second layer are laminated, the first layer including a transmissive portion that transmits light of a predetermined wavelength band and a light shielding portion that shields light, the transmissive portion and the light shielding portion being alternately disposed along the first direction, the second layer including the transmissive portion and the light shielding portion that are alternately disposed along the second direction, wherein
the transmissive portion included in one of the first layer and the second layer includes a first wavelength selecting unit that transmits light of a first wavelength band and a second wavelength selecting unit that transmits light of a second wavelength band,
the transmissive portion included in another one of the first layer and the second layer includes a third wavelength selecting unit that transmits light of a third wavelength band, and
the third wavelength selecting unit is a filter that transmits both light of the first wavelength band and light of the second wavelength band and that shields light of a predetermined wavelength band other than the first wavelength band and the second wavelength band.

2. The optical sensor according to claim 1, wherein the first wavelength selecting unit and the second wavelength selecting unit are alternately disposed.

3. An optical sensor comprising:
a light receiving part including a plurality of pixels and receiving light from a measuring object, the pixels being disposed in a matrix along a first direction and a second direction orthogonal to the first direction in a plan view; and
a louver part in which a first layer and a second layer are laminated, the first layer including a first wavelength selecting unit that transmits light of a first wavelength band and a second wavelength selecting unit that transmits light of a second wavelength band, the first wavelength selecting unit and the second wavelength selecting unit being alternately disposed along the first direction, the second layer including the first wavelength selecting unit and the second wavelength selecting unit, which are alternately disposed along the second direction.

* * * * *